(12) United States Patent
Rogers et al.

(10) Patent No.: US 12,465,366 B2
(45) Date of Patent: Nov. 11, 2025

(54) SYSTEMS AND METHODS FOR NEUROVASCULAR INTERVENTIONS

(71) Applicant: Boston Scientific Scimed, Inc., Maple Grove, MN (US)

(72) Inventors: Erica J. Rogers, Sunnyvale, CA (US); Cynthia Chiu, Sunnyvale, CA (US); Neda Haque, Sunnyvale, CA (US); Natasha Johnston, Sunnyvale, CA (US); Mark C. Page, Sunnyvale, CA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 581 days.

(21) Appl. No.: 17/773,200

(22) PCT Filed: Oct. 30, 2020

(86) PCT No.: PCT/US2020/058365
§ 371 (c)(1),
(2) Date: Apr. 29, 2022

(87) PCT Pub. No.: WO2021/087363
PCT Pub. Date: May 6, 2021

(65) Prior Publication Data
US 2022/0401111 A1    Dec. 22, 2022

Related U.S. Application Data

(60) Provisional application No. 62/987,099, filed on Mar. 9, 2020, provisional application No. 62/960,899, filed (Continued)

(51) Int. Cl.
*A61B 17/00*    (2006.01)
*A61B 17/12*    (2006.01)

(52) U.S. Cl.
CPC .... *A61B 17/12136* (2013.01); *A61B 17/0057* (2013.01); *A61B 2017/00623* (2013.01)

(58) Field of Classification Search
CPC .. A61M 1/3653; A61M 1/3613; A61M 39/06; A61M 39/223; A61M 1/3659; A61B 2017/00623
See application file for complete search history.

(56) References Cited

U.S. PATENT DOCUMENTS

| 5,456,667 A | 10/1995 | Ham et al. |
| 5,794,629 A | 8/1998 | Frazee |

(Continued)

FOREIGN PATENT DOCUMENTS

| JP | 2014195630 A | 10/2014 |
| JP | 2018-508270 A | 3/2018 |

(Continued)

OTHER PUBLICATIONS

Frazee, J. G. and X. Luo (1999). "Retrograde Transvenous Perfusion." Crit Care Clin 15(4): 777-88, vii.
(Continued)

*Primary Examiner* — Susan S Su
*Assistant Examiner* — Erin A Kim
(74) *Attorney, Agent, or Firm* — Seager, Tufte & Wickhem, LLP

(57) ABSTRACT

Methods and devices are configured for neurointerventional procedures. The methods and devices enable safe and rapid access to the cerebral or intracranial arteries for the introduction of interventional devices such as to treat stroke and/or other disease conditions. The methods and devices include a vascular access and retrograde flow system that can be used safely and rapidly in the neurointerventional procedures.

20 Claims, 26 Drawing Sheets

Related U.S. Application Data on Jan. 14, 2020, provisional application No. 62/928,556, filed on Oct. 31, 2019.

(56) References Cited

U.S. PATENT DOCUMENTS

| | | |
|---|---|---|
| 5,938,645 A | 8/1999 | Gordon |
| 5,964,773 A | 10/1999 | Greenstein |
| 6,379,325 B1 | 4/2002 | Benett et al. |
| 6,413,235 B1 | 7/2002 | Parodi |
| 6,423,032 B2 | 7/2002 | Parodi |
| 6,428,531 B1 | 8/2002 | Visuri et al. |
| 6,436,087 B1* | 8/2002 | Lewis ............... A61M 25/007 604/6.14 |
| 6,481,439 B1 | 11/2002 | Lewis et al. |
| 6,595,953 B1 | 7/2003 | Coppi et al. |
| 6,663,650 B2 | 12/2003 | Sepetka et al. |
| 6,679,893 B1 | 1/2004 | Tran |
| 6,685,722 B1 | 2/2004 | Rosenbluth et al. |
| 6,730,104 B1 | 5/2004 | Sepetka et al. |
| 6,824,545 B2 | 11/2004 | Sepetka et al. |
| 6,837,881 B1 | 1/2005 | Barbut |
| 6,929,632 B2 | 8/2005 | Nita et al. |
| 7,001,400 B1 | 2/2006 | Modesitt et al. |
| 7,004,952 B2 | 2/2006 | Nobles et al. |
| 7,083,594 B2 | 8/2006 | Coppi |
| 7,993,366 B2 | 8/2011 | Yassinzadeh et al. |
| 9,241,699 B1 | 1/2016 | Kume et al. |
| 2001/0044598 A1 | 11/2001 | Parodi |
| 2002/0133111 A1 | 9/2002 | Shadduck |
| 2002/0183783 A1 | 12/2002 | Shadduck |
| 2003/0212384 A1 | 11/2003 | Hayden |
| 2004/0133232 A1 | 7/2004 | Rosenbluth et al. |
| 2005/0154344 A1 | 7/2005 | Chang |
| 2005/0154349 A1 | 7/2005 | Renz et al. |
| 2006/0058836 A1 | 3/2006 | Bose et al. |
| 2006/0058837 A1 | 3/2006 | Bose et al. |
| 2006/0058838 A1 | 3/2006 | Bose et al. |
| 2007/0198028 A1 | 8/2007 | Miloslavski et al. |
| 2008/0177245 A1 | 7/2008 | Mesallum |
| 2009/0024072 A1 | 1/2009 | Criado et al. |
| 2009/0198172 A1 | 8/2009 | Garrison et al. |
| 2009/0254166 A1 | 10/2009 | Chou et al. |
| 2009/0299393 A1 | 12/2009 | Martin et al. |
| 2010/0036329 A1 | 2/2010 | Razack |
| 2010/0042118 A1 | 2/2010 | Garrison et al. |
| 2010/0185216 A1 | 7/2010 | Garrison et al. |
| 2010/0204684 A1 | 8/2010 | Garrison et al. |
| 2010/0217276 A1 | 8/2010 | Garrison et al. |
| 2010/0228269 A1 | 9/2010 | Garrison et al. |
| 2011/0004147 A1 | 1/2011 | Renati et al. |
| 2011/0034986 A1 | 2/2011 | Chou et al. |
| 2011/0125131 A1 | 5/2011 | Chang |
| 2011/0213459 A1 | 9/2011 | Garrison et al. |
| 2013/0197621 A1* | 8/2013 | Ryan ............... A61B 17/0625 623/1.11 |
| 2014/0012231 A1 | 1/2014 | Fischell |
| 2014/0046346 A1 | 2/2014 | Hentges et al. |
| 2014/0135661 A1 | 5/2014 | Garrison et al. |
| 2014/0296769 A1 | 10/2014 | Hyde et al. |
| 2014/0296868 A1 | 10/2014 | Garrison et al. |
| 2015/0080942 A1 | 3/2015 | Garrison et al. |
| 2015/0174368 A1 | 6/2015 | Garrison et al. |
| 2015/0327843 A1 | 11/2015 | Garrison |
| 2016/0220741 A1 | 8/2016 | Garrison et al. |
| 2016/0242764 A1 | 8/2016 | Garrison et al. |
| 2016/0296690 A1* | 10/2016 | Kume ............... A61M 1/3656 |
| 2016/0317288 A1 | 11/2016 | Rogers et al. |
| 2017/0296798 A1 | 10/2017 | Kume et al. |
| 2017/0354803 A1 | 12/2017 | Kume et al. |
| 2018/0235789 A1 | 8/2018 | Wallace et al. |
| 2019/0125512 A1 | 5/2019 | MacDonald et al. |
| 2019/0351182 A1* | 11/2019 | Chou ............... A61B 17/22 |
| 2020/0397472 A1 | 12/2020 | MacDonald et al. |
| 2021/0145453 A1 | 5/2021 | Kume |
| 2022/0047267 A1 | 2/2022 | Johnston et al. |
| 2022/0193321 A1 | 6/2022 | Kume et al. |
| 2023/0067426 A1 | 3/2023 | Steele et al. |
| 2023/0101242 A1 | 3/2023 | Steele et al. |
| 2023/0165696 A1 | 6/2023 | Kume et al. |

FOREIGN PATENT DOCUMENTS

| | | |
|---|---|---|
| WO | WO-2016/126974 A1 | 8/2016 |
| WO | WO-2021/087480 A1 | 5/2021 |
| WO | WO-2021/102011 A1 | 5/2021 |
| WO | WO-2022/035890 A1 | 2/2022 |
| WO | PCT/US2022/051275 | 11/2022 |
| WO | PCT/US2022/080992 | 12/2022 |
| WO | WO-2022/266195 A1 | 12/2022 |
| WO | PCT/US2023/016058 | 3/2023 |
| WO | PCT/US2023/064772 | 3/2023 |
| WO | PCT/US2023/023603 | 5/2023 |
| WO | PCT/US2023/025266 | 6/2023 |
| WO | WO-2023/096898 A1 | 6/2023 |
| WO | WO-2023/107926 A1 | 6/2023 |
| WO | PCT/US2023/027339 | 7/2023 |
| WO | PCT/US2023/028248 | 7/2023 |
| WO | PCT/US2023/033165 | 9/2023 |
| WO | PCT/US2023/033949 | 9/2023 |
| WO | WO-2023/183476 A1 | 9/2023 |
| WO | WO-2023/183808 A2 | 9/2023 |

OTHER PUBLICATIONS

Frazee, J. G., X. Luo, et al. (1998). "Retrograde Transvenous Neuroperfusion: A Back Door Treatment for Stroke." Stroke 29(9): 1912-1916.
Henry, et al. (1999). "Carotid Stenting With Cerebral Protection: First Clinical Experience Using the PercuSurge GuardWire System" *J. Endovasc. Surg.* 6:321-331.
U.S. Appl. No. 14/227,585, filed Mar. 27, 2014, US 2014-0296769.
U.S. Appl. No. 15/049,637, filed Feb. 22, 2016, US 2016-0242764.
U.S. Appl. No. 15/399,638, filed Jan. 5, 2017, US 2017-0209260.
U.S. Appl. No. 16/530,783, filed Aug. 2, 2019, US 2020-0054871.
U.S. Appl. No. 16/906,457, filed Jun. 19, 2020, US 2020-0397472.
U.S. Appl. No. 16/951,767, filed Nov. 18, 2020, US 2021-0145453.
U.S. Appl. No. 16/999,634, filed Aug. 21, 2020, US 2020-0375728.
U.S. Appl. No. 16/999,640, filed Aug. 21, 2020, US 2020-0375729.
U.S. Appl. No. 17/000,004, filed Aug. 21, 2020, US 2020-0390438.
U.S. Appl. No. 17/074,299, filed Oct. 19, 2020, US 2021-0205571.
U.S. Appl. No. 17/149,450, filed Jan. 14, 2021, US 2021-0298929.
U.S. Appl. No. 17/179,746, filed Feb. 19, 2021, US 2021-0244522.
U.S. Appl. No. 17/206,665, filed Mar. 19, 2021, US 2021-0307945.
U.S. Appl. No. 17/237,911, filed Apr. 22, 2021, US 2021-0236790.
U.S. Appl. No. 17/307,359, filed May 4, 2021, US 2021-0322738.
U.S. Appl. No. 17/345,502, filed Jun. 11, 2021, US 2021-0299343.
U.S. Appl. No. 17/345,544, filed Jun. 11, 2021, US 2021-0299425.
U.S. Appl. No. 17/398,969, filed Aug. 10, 2021, US 2022-0047267.
U.S. Appl. No. 17/406,822, filed Aug. 19, 2021, US 2022-0040502.
U.S. Appl. No. 17/555,127, filed Dec. 17, 2021, US 2022-0193321.
U.S. Appl. No. 17/684,745, filed Mar. 2, 2022, US 2023-0045964.
U.S. Appl. No. 17/749,423, filed May 20, 2022, US 2023-0001161.
U.S. Appl. No. 17/749,454, filed May 20, 2022, US 2023-0097442.
U.S. Appl. No. 17/773,206, filed Apr. 29, 2022, US 2022-0378565.
U.S. Appl. No. 17/899,279, filed Aug. 30, 2022, US 2023-0067426.
U.S. Appl. No. 17/951,727, filed Sep. 23, 2022, US 2023-0101242.
U.S. Appl. No. 18/071,323, filed Nov. 29, 2022, US 2023-0165696.
U.S. Appl. No. 18/301,838, filed Apr. 17, 2023, US 2024-0091424.
U.S. Appl. No. 18/448,483, filed Aug. 11, 2023, US 2024-0149028.
U.S. Appl. No. 16/894,474, filed Jun. 5, 2020, US 2020-0297912.
U.S. Appl. No. 17/220,718, filed Apr. 1, 2021, US 2021-0290213.

* cited by examiner

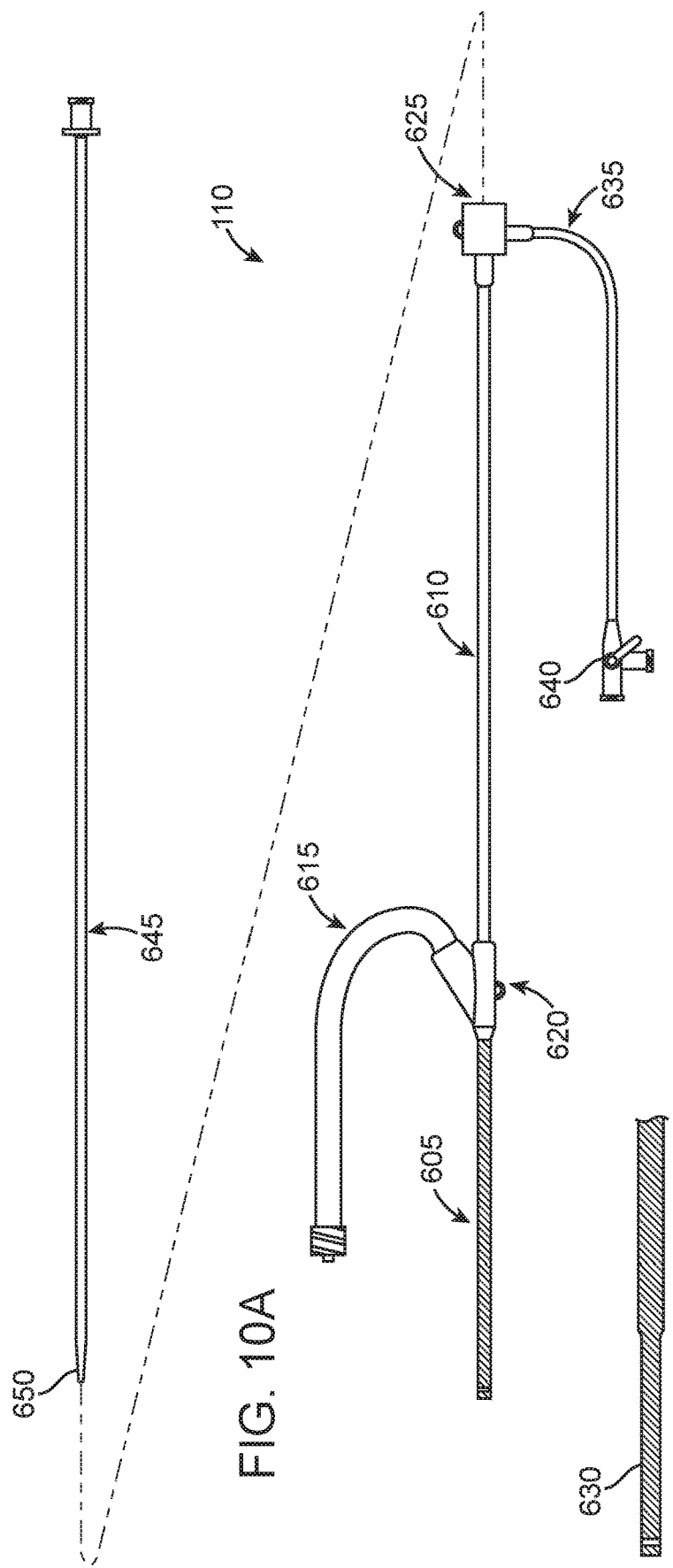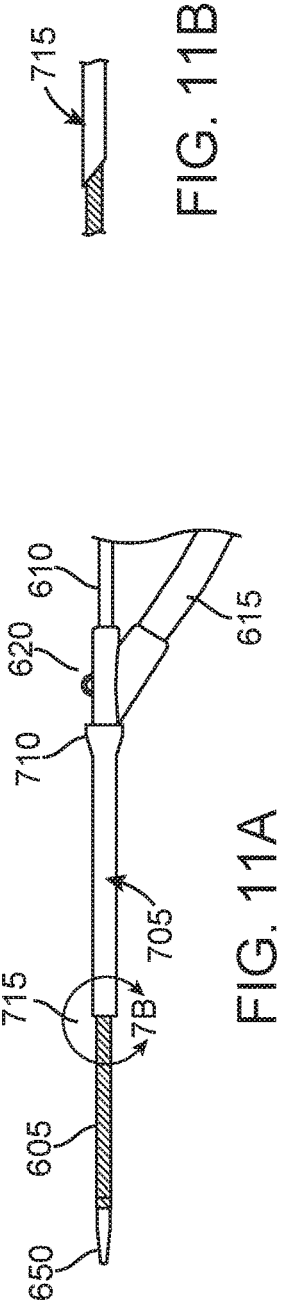

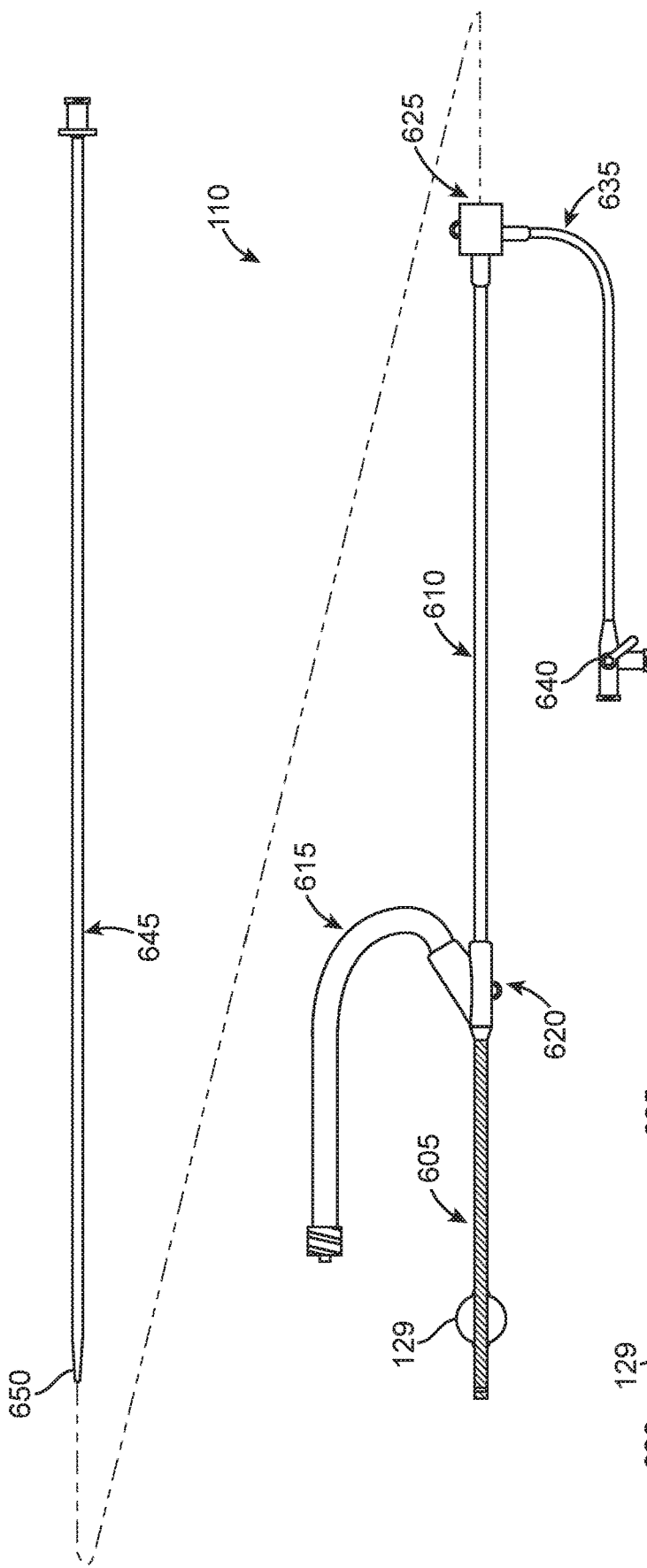

SYSTEMS AND METHODS FOR NEUROVASCULAR INTERVENTIONS

CROSS-REFERENCE TO RELATED APPLICATIONS

This application is the national stage filing under USC 371 of international application PCT/US2020/058365, filed Oct. 30, 2020, which claims priority to U.S. Patent Application No. 62/928,556, filed Oct. 31, 2019, entitled "SYSTEMS AND METHODS FOR NEUROVASCULAR INTERVENTIONS", U.S. Patent Application No. 62/960,899, filed Jan. 14, 2020, entitled "SYSTEMS AND METHODS FOR NEUROVASCULAR INTERVENTIONS", U.S. Patent Application No. 62/987,099, filed Mar. 9, 2020, entitled "SYSTEMS AND METHODS FOR NEUROVASCULAR INTERVENTIONS", the contents of which are hereby incorporated by reference herein in their entirety.

BACKGROUND

The present disclosure relates generally to medical methods and devices. More particularly, the present disclosure relates to methods and systems for accessing and treating the cerebral arterial vasculature such as for the treatment of stroke, Intracranial Atherosclerotic Disease (ICAD), transient ischemic attack (TIA), acute ischemic stroke (AIS), tandem lesions, ruptured and unruptured intra and extracranial aneurysm embolization, chronic occlusions, and other disease conditions of the neurovasculature.

SUMMARY

Disclosed are methods and devices for neurointerventional procedures. The methods and devices enable safe and rapid access to the cerebral or intracranial arteries for the introduction of interventional devices such as to treat stroke and/or other disease conditions. The methods and devices include a vascular access and retrograde flow system that can be used safely and rapidly in the neurointerventional procedures. In addition, the disclosed methods and devices provide means to securely close an access site to the cerebral arteries to avoid the potentially devastating consequences of a transcervical hematoma.

The disclosed systems and methods access the cerebral vasculature via an access location in the neck, such as in the region of the carotid artery (which can include the common carotid artery, the external carotid artery, or the external carotid artery.) The access location can be a percutaneous or a surgical approach (such as via an open surgical incision or cut-down). Such a transcarotid access location enables a short pathway to intracranial arteries relative to other access locations such as a femoral artery access location. The transcarotid access location also enables use of significantly shorter interventional devices. The shorter pathway and interventional device length provide a higher level of control that reduces or minimizes device-related complications such as a high rate of guidewire perforation and allow for accurate placement of an interventional device such as a stent.

As discussed further below, the disclosed systems and methods can optionally utilize blood flow reversal at least through the carotid artery such that blood flows away from the brain to protect the brain from embolic debris that might be liberated during a neurointervention procedure. During a procedure that treats a disease condition such as ICAD, guidewires, balloons and stents can be passed through an atherosclerotic narrowing, which increases the risk for embolic debris to break free and travel "north" to the brain causing stroke and transient ischemic attack. The blood flow reversal reduces or eliminates such risk.

In one aspect, there is disclosed a transcarotid access system configured for treatment of a neurovascular condition, comprising: an arterial access sheath having a sheath body defining an internal lumen, the sheath body sized and shaped to be introduced into an opening a common carotid artery and receive blood flow from the carotid artery; an adapter positioned at a proximal end of the sheath body, the adapter having a hub adapted to be removably connected to a flow shunt line, the adapter further having a valve positioned adjacent to an internal lumen of the transcarotid access system, wherein the valve regulates fluid flow out of the internal lumen of the arterial access sheath toward the hub; and a proximal extension connected to a proximal end of the adapter, the proximal extension having an internal lumen in fluid communication with the internal lumen of the arterial access sheath via the adapter, the proximal extension formed of an elongated body that defines a proximal opening that communicates with the internal lumen of the proximal extension, wherein the proximal opening is unimpeded.

In another aspect, there is disclosed a method of treating an intracranial artery comprising: inserting an arterial access device into a carotid artery via an opening in the carotid artery and access location in a neck of a patient, the arterial access device including: an arterial access sheath having a sheath body defining an internal lumen, the sheath body sized and shaped to be introduced into an opening in a common carotid artery and receive blood flow from the carotid artery; an adapter positioned at a proximal end of the sheath body, the adapter having a hub adapted to be removably connected to a flow shunt line, the adapter further having a valve positioned adjacent to an internal lumen of the transcarotid access system, wherein the valve regulates fluid flow out of the internal lumen of the arterial access sheath toward the hub; and a proximal extension connected to a proximal end of the adapter, the proximal extension having an internal lumen in fluid communication with the internal lumen of the arterial access sheath via the adapter, the proximal extension formed of an elongated body that defines a proximal opening that communicates with the internal lumen of the proximal extension, wherein the proximal opening is unimpeded; deploying an interventional device into the carotid artery via the arterial access device and treating an intracranial artery using the interventional device; detaching the adapter and proximal extension from the arterial access sheath such that the arterial access sheath remains inserted in the carotid artery without the adapter and proximal extension; inserting a closure element into the arterial access sheath; and deploying the closure element to achieve hemostasis in the opening of the carotid artery.

Other features and advantages should be apparent from the following description of various embodiments, which illustrate, by way of example, the principles of the invention.

BRIEF DESCRIPTION OF THE DRAWINGS

FIG. 10A illustrates another embodiment of an arterial access device.

FIG. 10B illustrates an additional arterial access device construction with a reduced diameter distal end.

FIGS. 11A and 11B illustrate a sheath stopper tube.

FIG. 12A illustrates an additional arterial access device construction with an expandable occlusion element.

FIG. 12B illustrates an additional arterial access device construction with an expandable occlusion element and a reduced diameter distal end.

DETAILED DESCRIPTION

Figure 1:
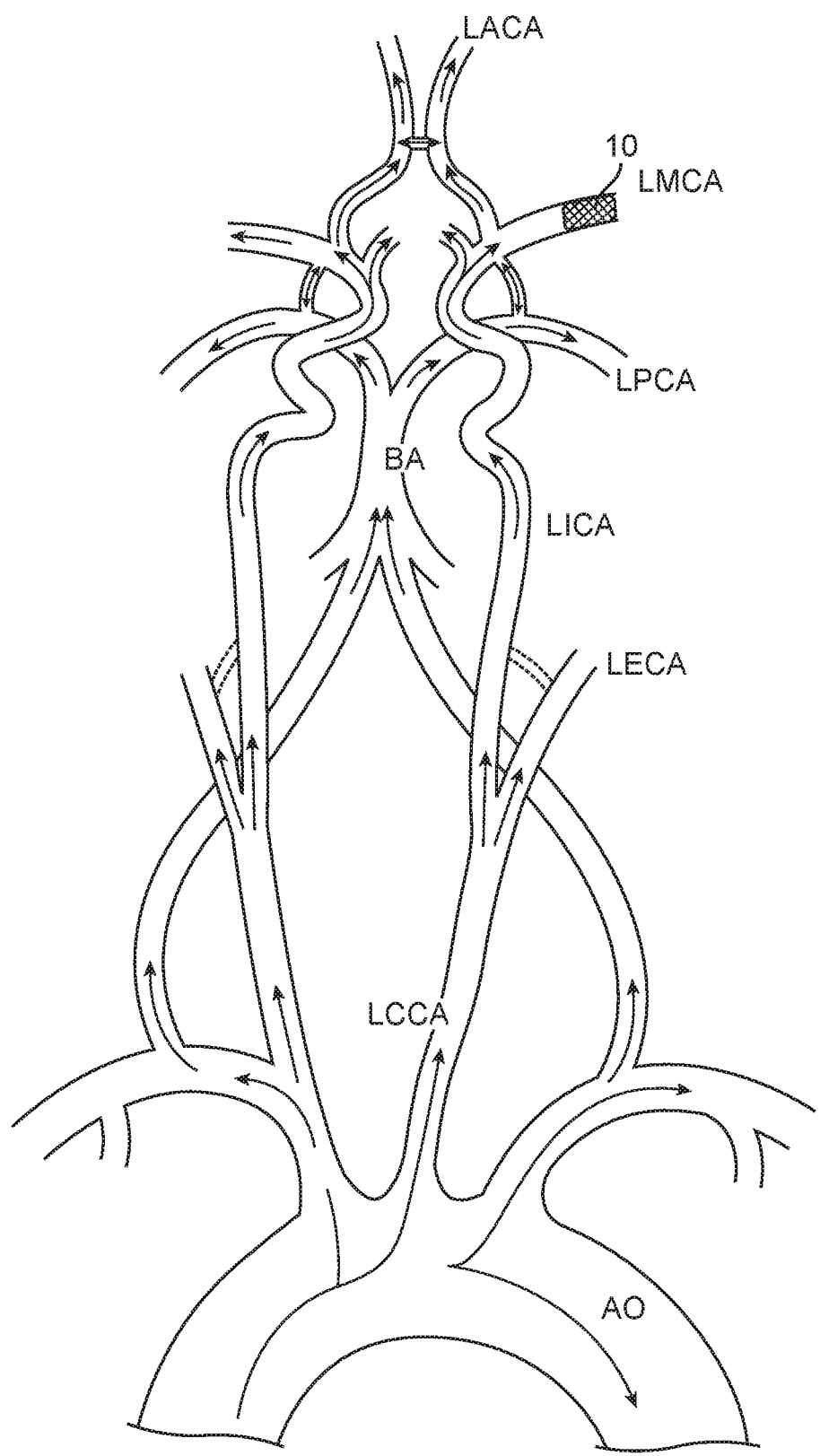
FIG. 1 schematically depicts normal, antegrade cerebral or intracranial circulation with a thrombotic occlusion in the left middle cerebral artery.

Disclosed are methods and devices that enable safe, rapid and relatively short access to the cerebral arteries for the introduction of interventional devices to treat a disease state or other condition in the intracranial vasculature. The disclosed systems and methods are configured for use in the cerebral arteries, neurovascular system, and intracranial arteries, which terms can be used herein interchangeably. In addition, the disclosed methods and devices are configured to securely close an access site to the cerebral arteries. The methods and devices include a vascular access and retrograde flow system that can be used safely and rapidly in the neurointerventional procedures.

The disclosed methods can be used pursuant to a percutaneous or surgical access to the patient's vasculature. In an implementation, the access location to the vasculature is in the region of the neck, such as in the carotid artery, which can include the common carotid artery, the internal carotid artery, or the external carotid artery. The disclosed systems and methods use a neuroprotection system configured to generate reverse flow (also referred to as retrograde flow) through at least a portion of the carotid artery. The neuroprotection system can also comprise a stagnation of flow in at least a portion of the carotid artery. To the extent retrograde flow is generated, it can be generated in a passive manner or an active manner, as described in more detail below. The disclosed systems and methods can also utilize aspiration in an intracranial artery and/or carotid artery.

The disclosed systems and methods can be used to treat any of a variety of intracranial and neurovascular conditions including, for example, stroke, acute stroke, large vessel occlusion, intracranial atherosclerotic disease (ICAD), tandem lesion, aneurysm, arteriovenous malformation (AVM), arteriovenous fistula, acute and chronic carotid total occlusions with any of a variety of interventional devices, including some examples described herein. In addition, a variety of closure devices and methods can be used in connection with closure of the access location so as to achieve hemostasis at the access location. The disclosed methods can be used in conjunction with placement of a stent in an artery or without placement of a stent.

In an exemplary method, an access location is provided or otherwise formed at the level of the neck, such as in a region of the carotid artery, which can be inclusive of the internal carotid artery, the external carotid artery, and/or the common carotid artery. The access location in an example is in the common carotid artery. An arterial access sheath (also referred to as an arterial access device), such as the arterial access device described herein, is then inserted into the artery via the access location. The sheath is inserted into the artery and passed therethrough until a distalmost tip of the sheath is positioned at a desired location. In an embodiment, a distalmost tip of the sheath is positioned in the internal carotid artery. In another embodiment, a distalmost tip of the sheath is positioned in the external carotid artery or common carotid artery. A flow reversal state is then optionally established such as by clamping or occluding a portion of the carotid artery to achieve a pressure differential, thereby establishing a reverse flow condition. The reverse flow blood condition causes blood to flow into the sheath from an artery (such as the carotid artery), where it can be routed or shunted to a return location, such as an external container or to the vasculature (a vein or artery). In another implementation, an active flow state can be achieved such as by using a pump or a syringe, as described in more detail below. As mentioned, a flow stagnation state can also or otherwise be achieved. The reverse flow condition acts as a neuroprotection system, as described in more detail below. As discussed below, a closure device can then be applied to the access location to establish hemostasis such as at the end of a treatment procedure. In an embodiment, the closure device is pre-deployed to the access location prior to introducing any device (such as a guidewire, sheath or interventional device) into an artery via the access location.

The arterial access device provides a passageway for insertion of an interventional tool or tools into the vasculature such that the interventional tool can be routed to a target treatment location, such as in a blood vessel of the brain. In an implantation, reverse flow is used in combination with an interventional tool comprising an aspiration catheter to aspirate a material (such as thrombotic material) into an intervention device, such as a catheter, and/or into the arterial access sheath. In this regard, the interventional device and/or the arterial access device can be inserted so that a distal-most tip of the device is positioned just proximal of the location to be aspirated or at any other location relative to the location to be aspirated. After the interventional tool is used for treatment, the reverse flow condition or stagnant flow condition is then ceased to restore antegrade flow. During the procedure, the reverse flow condition serves as a neuroprotection to limit or prevent material from flowing in an antegrade direction in the region of the intervention. As described below, a closure device can be deployed at the access location during or after the procedure without having to remove the arterial access device from the access location or having to exchange the arterial access device with another device.

FIG. 1 schematically depicts normal, antegrade cerebral circulation with an example disease state (a thrombotic occlusion 10) in, for example, the left middle cerebral artery RMCA. It should be appreciated that other disease states or conditions that require intervention are within the scope of this disclosure. The left middle cerebral artery RMCA branches from the left internal carotid artery RICA. The middle cerebral arteries are large arteries that have tree-like branches that bring blood to the entire lateral aspect of each hemisphere of the brain. The thrombotic occlusion 10 occludes or limits blood flow through the left middle cerebral artery. Thus, blood supply to the brain is severely interrupted by the presence of the thrombotic occlusion 10 in the left middle cerebral artery, creating an ischemic stroke condition.

Figure 2:
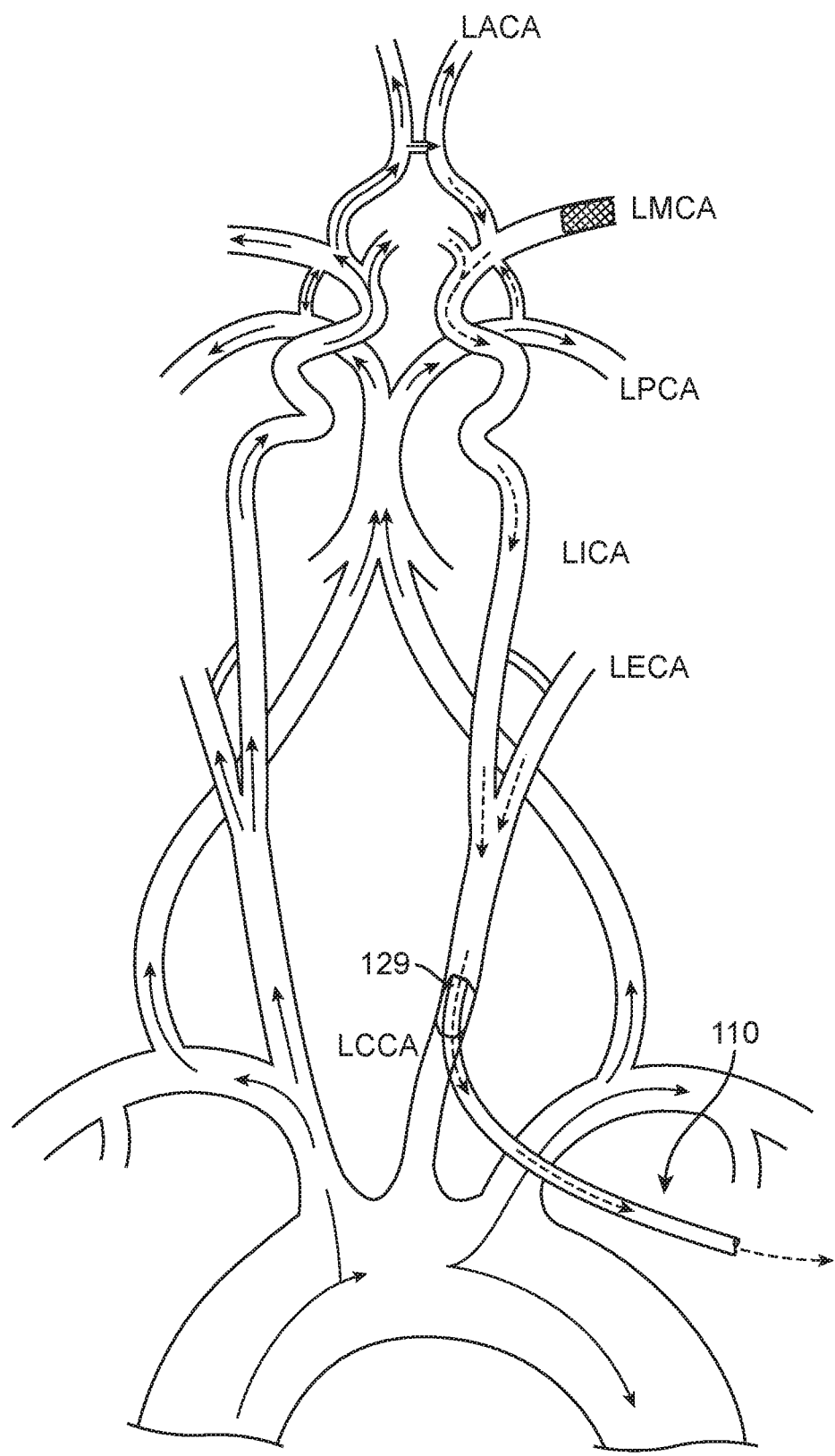
FIG. 2 depicts the blood flow circulation after retrograde flow has been established using the retrograde flow system described herein.

Pursuant to use of methods and systems described herein, a treatment method includes obtaining vascular access to the cerebral arteries and establishing retrograde flow in at least a portion of the cerebral circulation and/or in the carotid artery in order to treat the thrombotic occlusion. In an example procedure, an interventional device comprising mechanical thrombectomy device (such as a strentriever) is inserted into the cerebral vasculature to remove or otherwise treat the thrombotic occlusion such as under retrograde flow conditions, as described below. FIG. 2 depicts the blood flow circulation after retrograde flow has been established using the retrograde flow system described herein. The system includes an arterial access device 110 that enters the left common carotid artery LCCA (or right common carotid artery) to provide access to the cerebral vasculature. The artery can be clamped or an expandable occlusion element 129 on the arterial access device 110 can be used to occlude an artery in the cerebral vasculature and establish retrograde flow, as described more fully below. Various arteries may be occluded including, for example, the common carotid artery, internal carotid artery, and/or vertebral artery. Exemplary embodiments of the system and its components are described in detail below.

Figure 3:
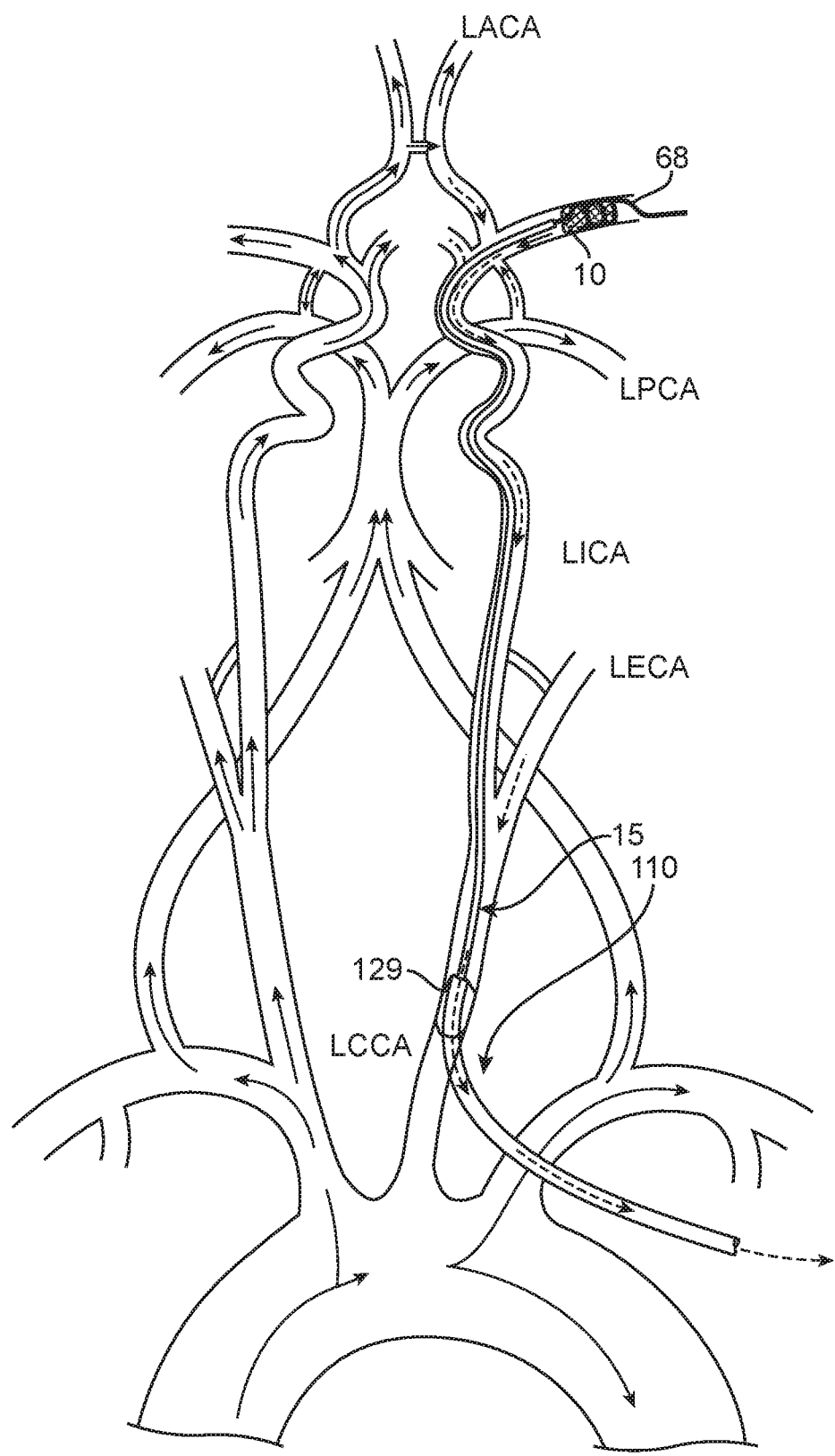
FIG. 3 shows the cerebral vasculature with an interventional device such as a mechanical thrombectomy device inserted through an exemplary arterial access device.

FIG. 3 shows the cerebral vasculature with a mechanical thrombectomy device 15 inserted through the arterial access device 110. The thrombectomy device 15 includes an elongate catheter that can be advanced through the arterial access device 110 to the location of the thrombotic occlusion 10. The thrombectomy device 15 has a distal region that includes a thrombus engaging element 68 that is adapted to interact with and remove the thrombotic occlusion 10, as described more fully below. The type of thrombectomy device can vary. In another embodiment, the interventional device is an aspiration catheter that is deployed to interact with the target location via the arterial access device 110.

Figure 4:
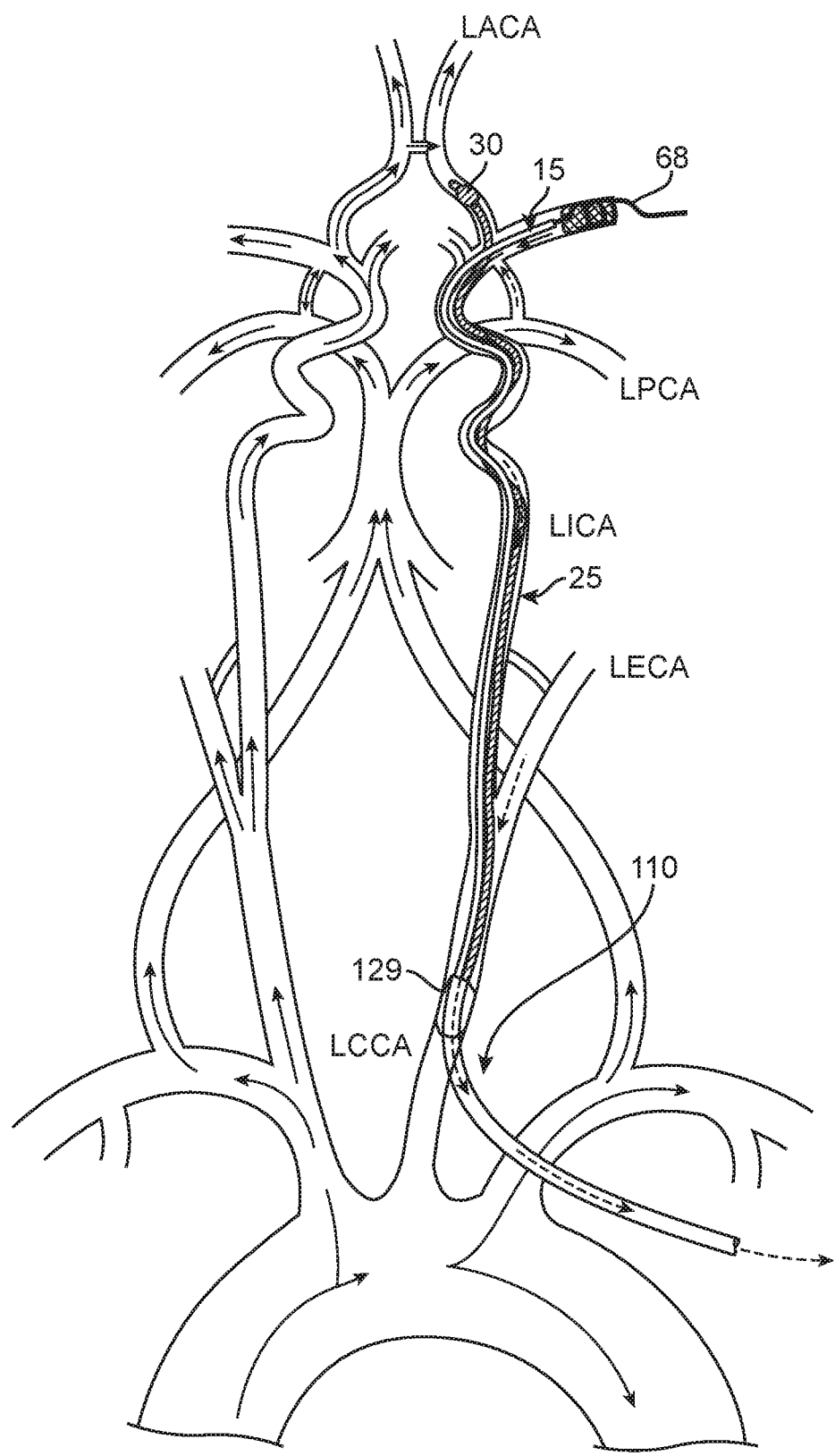
FIG. 4 shows an alternate embodiment wherein a secondary interventional device is advanced through the arterial access device and into a collateral cerebral artery.

FIG. 4 shows another embodiment wherein a secondary interventional device, such as a balloon catheter 25, is advanced through the arterial access device 110 and into a collateral cerebral artery such as the anterior cerebral artery ACA. The balloon catheter 25 includes an expandable balloon 30 that can be expanded in the collateral cerebral artery to occlude that artery. Occlusion of the collateral cerebral artery can enhance suction and reverse flow through the cerebral vasculature.

Figure 5:
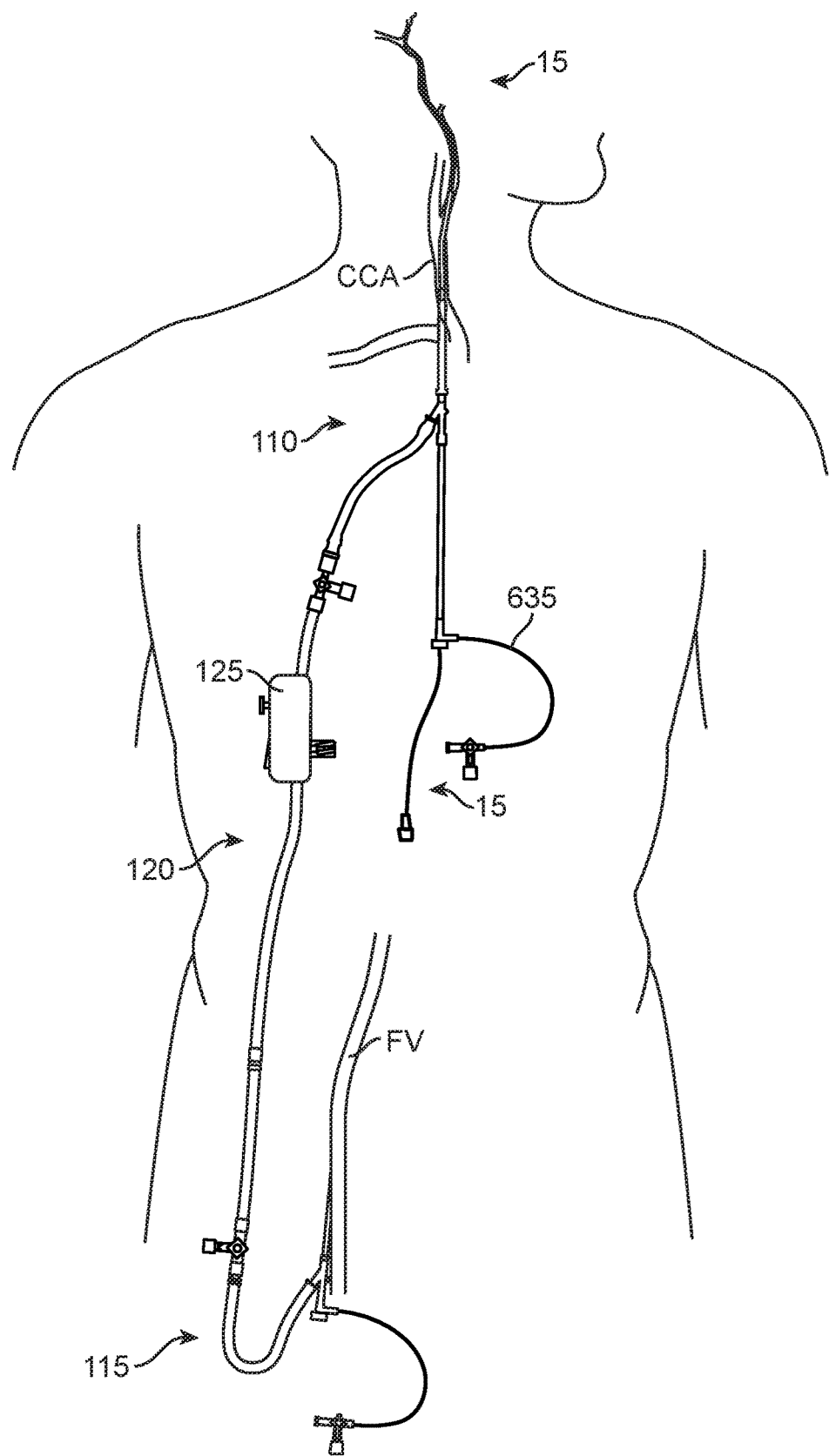
FIG. 5 shows an exemplary embodiment of a vascular access and reverse flow system that can be used to establish retrograde flow during an intervention.
Figure 6:
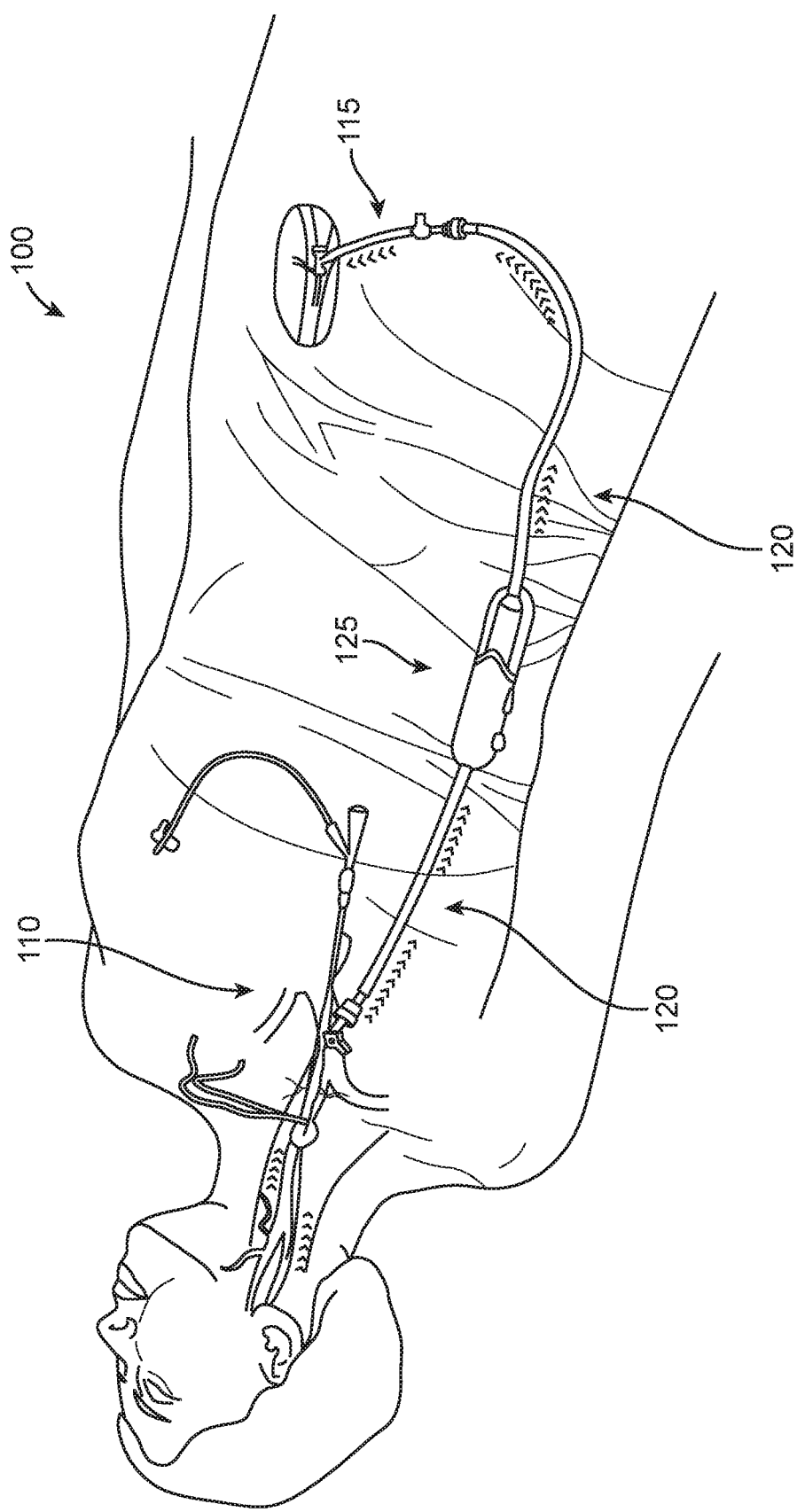
FIG. 6 shows another view of another exemplary embodiment of a vascular access and reverse flow system that can be used to establish retrograde flow during an intervention.

FIG. 5 shows an exemplary embodiment of a vascular access and reverse flow system 100 that can be used to establish retrograde flow during removal of the thrombotic occlusion 10. The system 100 includes the arterial access device 110, a vasculature return device, such as a venous return device 115, and a shunt 120 (which can be an extracorporeal shunt) that provides a passageway for retrograde flow from the arterial access device 110 to the venous return device 115. A flow control assembly 125 interacts with the shunt 120. The flow control assembly 125 is adapted to regulate and/or monitor the retrograde flow through the shunt 120, as described in more detail below. The flow control assembly 125 interacts with the flow pathway through the shunt 120, either external to the flow path, inside the flow path, or both. FIG. 6 shows another view of the vascular access and reverse flow system 100 coupled to a patient.

In an embodiment, the arterial access device 110 at least partially inserts into the common carotid artery CCA and the venous return device 115 at least partially inserts into a venous return site, such as for example the femoral vein or internal jugular vein, as described in more detail below. The venous return device 115 can be inserted into the femoral vein FV via a percutaneous puncture in the groin. The arterial access device 110 and the venous return device 115 couple to opposite ends of the shunt 120 at connectors.

Figure 7:
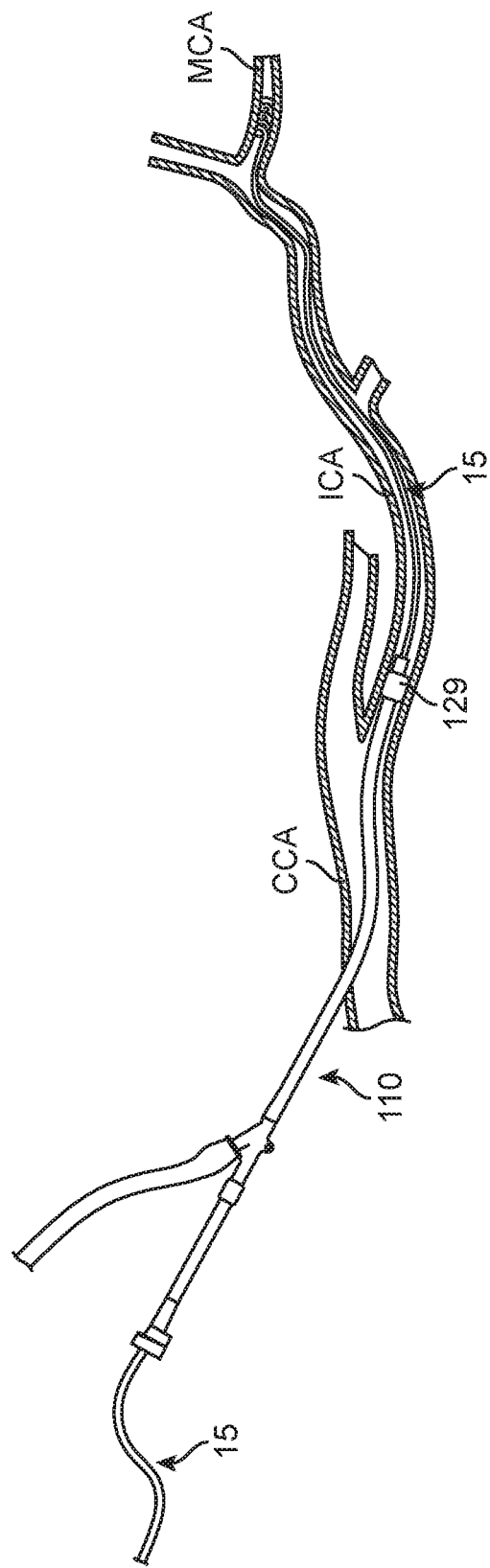
FIG. 7 shows an enlarged view of the common carotid artery (CCA), internal carotid artery (ICA), and middle cerebral artery with an arterial access device and a thrombectomy device deployed.

As shown in FIG. 7, the distal end of the arterial access device 110 (with an optional occlusion element 129 (if present)) may be positioned in the ICA or other portion of the carotid artery. Alternately, in some circumstances where the ICA access is extremely tortuous, it may be preferable to position the occlusion element more proximally in the common carotid artery. As mentioned, the ICA may also be clamped rather than occluded via an occlusion element. Thus, the artery may be occluded via an external location of the artery and/or via an internal location of the artery. When flow through the internal carotid artery is blocked (using the occlusion element 129 or clamp, such as umbilical tape vessel loop, etc.), a natural pressure gradient between the internal carotid artery and the venous system causes blood to flow in a retrograde or reverse direction from the cerebral vasculature through the internal carotid artery and through the shunt 120 into the venous system. The flow control assembly 125 modulates, augments, assists, monitors, and/or otherwise regulates the retrograde blood flow.

The interventional device (such as an aspiration catheter or other interventional device) is then deployed into the target location, such as the left middle cerebral artery, through the arterial access device 110 and via the internal carotid artery. A distal region of the interventional device 15 is positioned in the middle cerebral artery such as in interaction with the thrombotic occlusion or other disease state. A proximal region of the interventional device protrudes from an access port in the arterial access device 110. This is described in more detail with reference to FIG. 7, which shows an enlarged view of the common carotid artery CCA, internal carotid artery ICA, and middle cerebral artery MCA with the arterial access device 110 and the interventional device 15 deployed. The arterial access device 110 accesses the common carotid artery via a transcervical approach such as via a direct cut down to the common carotid artery CCA or a percutaneous puncture of the CCA. The interventional device 15 gains access to the internal carotid artery ICA via insertion through an internal lumen of the arterial access device 110, such as by being inserted into a proximal opening that provides access into the arterial access device 110.

As discussed, the arterial access device 110 provides access to the anterior and middle cerebral arteries via the common carotid artery CCA using a transcervical approach. Transcervical access provides a short length and non-tortuous pathway from the vascular access point to the target treatment site thereby easing the time and difficulty of the procedure, compared for example to a transfemoral approach. Additionally, this access route reduces the risk of emboli generation from navigation of diseased, angulated, or tortuous aortic arch or common carotid artery anatomy. In another embodiment, the arterial access device provides access to the basilar artery BA or posterior cerebral arteries PCA via a cut down incision to in the vertebral artery or a percutaneous puncture of the vertebral artery.

In an embodiment, the arterial access device 110 accesses the common carotid artery CCA via a direct surgical transcervical approach. In the surgical approach, the common carotid artery can be clamped or occluded using a tourniquet or other device.

In another embodiment, transcervical access to the common carotid artery is achieved percutaneously via an incision or puncture in the skin through which the arterial access device 110 is inserted. If an incision is used, then the incision can be about 0.5 cm in length for example. An occlusion element 129, such as an expandable balloon, can be used to occlude the internal carotid artery ICA or the common carotid artery CCA at a location proximal of the distal tip of the arterial access device 110. The occlusion element 129 can be located on the arterial access device 110 or it can be located on a separate device In another embodiment, the arterial access device 110 accesses the common carotid artery CCA via a transcervical approach while the venous return device 115 access a venous return site other than the femoral vein, such as the internal jugular vein.

In another embodiment, the system provides retrograde flow from the carotid artery to an external receptacle rather than to a venous return site. The arterial access device 110 connects to the receptacle via the shunt 120, which communicates with the flow control assembly 125. The retrograde flow of blood is collected in the receptacle 130. If desired, the blood is filtered and subsequently returned to the patient. The pressure of the receptacle 130 could be set at zero pressure (atmospheric pressure) or even lower, causing the blood to flow in a reverse direction from the cerebral vasculature to the receptacle 130. Optionally, to achieve or enhance reverse flow from the internal carotid artery, flow from the external carotid artery can be blocked, typically by deploying a balloon or other occlusion element in the external carotid artery just above the bifurcation with the internal carotid artery.

In another embodiment, reverse flow may be replaced or augmented by application of an aspiration source to a port (such as a stopcock) that communicates with the flow shunt 120. Examples of an aspiration source include a syringe, pump, or the like. Alternately, the system may include an active pump as part of the flow control assembly 125, with controls for pump flow rate and/or flow monitoring included in the assembly.

In yet another embodiment, the system may be used to deliver intra-arterial thrombolytic therapy, such as through a sidearm in the arterial access device 110. For example, thrombolytic therapy may be infused to the thrombotic occlusion 10 through the arterial access device 110 via a flush line 635. In another embodiment, the system may be used to deliver intra-arterial thrombolytic therapy via a micro catheter which is inserted into the arterial access device 110. The micro catheter is delivered to the site of the thrombotic occlusion 10 to infuse a thrombolytic drug. The thrombolytic therapy may be delivered either in conjunction with or as an alternative to mechanical thrombectomy such as the thrombectomy device 15.

In another embodiment, the system 100 may include a means to perfuse the cerebral vasculature and ischemic brain tissue via a perfusion catheter delivered, for example, through the arterial access device 110 to a site distal to the thrombotic occlusion 10. The perfusion catheter is adapted to deliver a perfusion solution to a desired location. Perfusion solution may include, for example, autologous arterial blood, either from the AV shunt 120 or from another artery, oxygenated solution, or other neuroprotective agents. In addition, the perfusion solution may be hypothermic to cool the brain tissue, another strategy which has been shown to minimize brain injury during periods of ischemia. The perfusion catheter may also be used to deliver a bolus of an intra-arterial thrombolytic agent pursuant to thrombolytic therapy. Typically, thrombolytic therapy may take up to 1-2 hours or more to clear a blockage after the bolus has been delivered. Mechanical thrombectomy may also take up to 1 to 2 hours to successfully recanalize the blocked artery. Distal perfusion of the ischemic region may minimize the level of brain injury during the stroke treatment procedure.

Another embodiment of the system 100 includes a means for retroperfusion of the cerebral vasculature during the acute stroke treatment procedure. Cerebral retroperfusion as described by Frazee et al involves selective cannulation and occlusion of the transverse sinuses via the internal jugular vein, and infusion of blood via the superior sagittal sinus to the brain tissue, during treatment of ischemic stroke. The following articles, which are incorporated herein by reference in their entirety, described cerebral retroperfusion and are incorporated by reference in their entirety: Frazee, J. G. and X. Luo (1999). "Retrograde transvenous perfusion." Crit Care Clin 15(4): 777-88, vii.; and Frazee, J. G., X. Luo, et al. (1998). "Retrograde transvenous neuroperfusion: a back door treatment for stroke." Stroke 29(9): 1912-6. This perfusion, in addition to providing protection to the cerebral tissue, may also cause a retrograde flow gradient in the cerebral arteries. Used in conjunction with the reverse flow system 100, a retroperfusion component may provide oxygen to brain tissue, as well as aid in capture of embolic debris into the reverse flow shunt during recanalization of the thrombotic occlusion 10.

Any of a variety of interventional devices can be used. For example, the interventional device can be a thrombectomy device such as a stentriever device, which can be for example, a self-expanding mesh tube attached to a wire, which is guided via the arterial access device (and possibly a secondary catheter) into the vasculature such that the device can engage a clot or other disease state. A user guides the device through various blood vessels up to the treatment location such as blood clot in the brain. The stentriever then is used to grab the clot, which is pulled out when the user removes the catheter. In an example embodiment, the interventional device is any device that is configured to be delivered to a treatment site and provide treatment such as by delivering a substance to the site, removing a substance from the site, and/or interacting with the treatment site in any manner. For example, a stent, balloon, coil, glue, liquid, solid, or gel can be delivered to the treatment site. The thrombectomy device may include or be coupled to a microcatheter to assist in delivering the device into the distal vasculature.

It should be appreciated that the thrombectomy device 15 is not limited to a specific embodiment and that various embodiments of thrombectomy devices or therapeutic devices may also be used. For example, the device may be an expandable cage, basket, snare, or grasper which is used to capture and remove the thrombotic blockage. The device may also be a clot disruption device, which may be used to break up the thrombus for easier aspiration and removal. The clot disruption device may be, for example, a mechanical disrupter, sonic or ultrasonic energy source, or other energy source, or a hydraulic or vortex energy source, to break up the clot. The thrombectomy device may also comprise a aspiration means to remove the thrombotic blockage.

Other means for providing flow through a thrombotic blockage include recanalizing means, for example delivering a balloon catheter and dilating a passage through the blockage, or deploying a stent through the thrombotic blockage to create a lumen through the blockage. A stent device may be a permanent implantable stent or may be a temporary stent to open up the blocked passage for a period of time before being retrieved. The blockage may be removed by the stent or by some other thrombectomy means. Both thrombectomy and recanalization devices may be used in conjunction with thrombolytic infusion. Some exemplary stent-related devices and methods are described in the following U.S. Patents, which are incorporated herein by reference in their entirety: U.S. Pat. Nos. 5,964,773 and 5,456,667.

An example use of the vascular access and reverse flow system with the thrombectomy device 15 is now described. The arterial access device 110 is introduced into the common carotid artery CCA of the patient and at least partially positioned (such as a distal end of the distal sheath) in the distal common carotid artery or internal carotid artery, as shown in FIG. 7. The thrombectomy device 15 is then advanced through the arterial access device 110, either with or without the microcatheter 60, into the carotid artery. Before advancing the thrombectomy device 15 further, the occlusion element 129 on the arterial access device 110 may be expanded to reduce or even stop antegrade flow through the vessel. In another embodiment, antegrade flow is stopped by externally clamping on the blood vessel. Stopping flow in the vessel may help prevent the thrombotic emboli or any parts thereof from migrating downstream due to antegrade flow during positioning of the thrombectomy device 15 or retrieval of the thrombus. The thrombectomy device 15 is then advanced, either through the microcatheter 60 or by itself within the arterial access device 110, further into the vasculature to a position proximal to, within or distal to the thrombotic occlusion 10. During any part of the procedure, reverse flow may be initiated in the vessel via a retrograde flow system (described below) and/or via active aspiration. In an embodiment, there is a gap between an outer diameter of the device 15 and an inner diameter of the arterial access device 110 at the location where the device 15 protrudes and exits from the distal opening of the arterial access device. The gap is sized such that there is no seal between the outer diameter of the device 15 and an inner diameter of the arterial access device 110, which permits reverse-flowing blood to flow into the distal opening of the arterial access device from which the device 115 protrudes.

The thrombectomy device 15 is then placed into contact with the thrombotic occlusion 10 and possibly through the thrombotic occlusion.

The thrombectomy device 15 may be used in any suitable manner to engage the thrombotic occlusion. For example, the microcatheter 60 or sheath 65 may be advanced through the thrombotic occlusion and then retracted to expose the thrombectomy device 15. The thrombectomy device 15 is then retracted into the thrombotic occlusion to engage the thrombotic occlusion. The thrombectomy device 15 may be rotated when moved into the thrombotic occlusion. The thrombectomy device 15 may also be used to engage the thrombotic occlusion by simply retracting the microcatheter 60 or sheath 65 with the thrombectomy device 15 expanding within the thrombotic occlusion.

Another method of aiding mechanical capture of a thrombotic occlusion is to coat the device and elements of the device with a material which helps to adhere the thrombotic occlusion, and in particular thrombus, to the device or element. The material may be, for example, fibrin or may be any other suitable material.

It may be appreciated that other mechanical thrombectomy catheters may be used in a similar manner with the vascular access and reverse flow system as described above. Mechanical thrombectomy devices may include variations on the thrombus retrieval device described above, such as expandable cages, wire or filament loops, graspers, brushes, or the like. These clot retrievers may include aspiration lumens to lower the risk of embolic debris leading to ischemic complications. Alternately, thrombectomy devices may include clot disruption elements such as fluid vortices, ultrasound or laser energy elements, balloons, or the like, coupled with flushing and aspiration to remove the thrombus. Some exemplary devices and methods are described in the following U.S. Patents and Patent Publications, which are all incorporated by reference in their entirety: U.S. Pat. Nos. 6,663,650, 6,730,104; 6,428,531, 6,379,325, 6,481, 439, 6,929,632, 5,938,645, 6,824,545, 6,679,893, 6,685,722, 6,436,087, 5,794,629, U.S. Patent Pub. No. 20080177245, U.S. Patent Pub. No. 20090299393, U.S. Patent Pub. No. 20040133232, U.S. Patent Pub. No. 20020183783, U.S. Patent Pub. No. 20070198028, U.S. Patent Pub. No. 20060058836, U.S. Patent Pub. No. 20060058837, U.S. Patent Pub. No. 20060058838, U.S. Patent Pub. No. 20060058838, U.S. Patent Pub. No. 20030212384, and U.S. Patent Pub. No. 20020133111.

Exemplary Embodiment of Retrograde Blood Flow System

As discussed, the system 100 includes the arterial access device 110, return device 115, and shunt 120 which provides a passageway for retrograde flow from the arterial access device 110 to the return device 115. The system also includes the flow control assembly 125, which interacts with the shunt 120 to regulate and/or monitor retrograde blood flow through the shunt 120. Exemplary embodiments of the components of the system 100 are now described. The system can include or be combined with a neurointerventional device.

Arterial Access Device

Figure 8A:
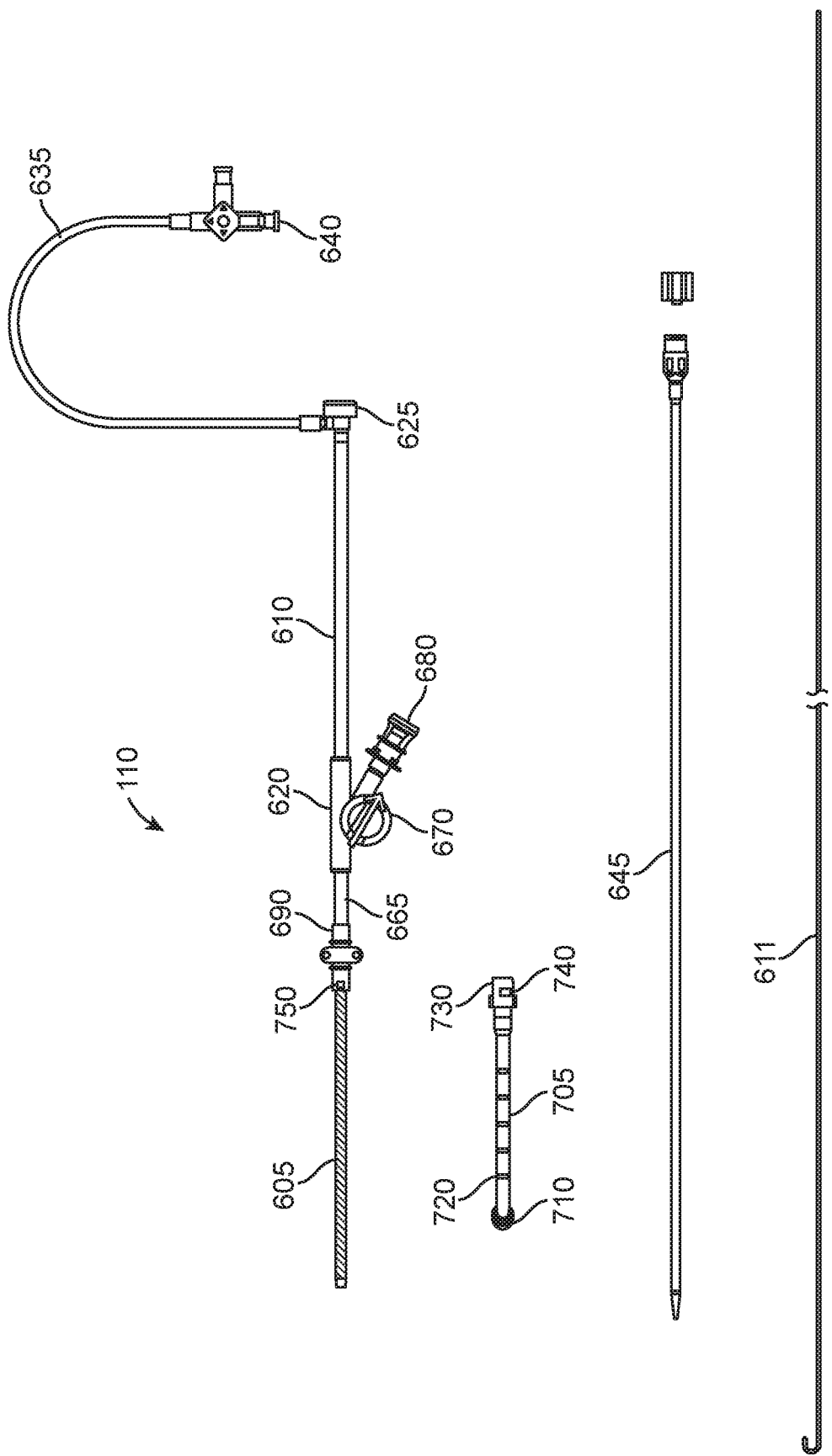
FIGS. 8A-9B show embodiments of an arterial access device or system useful in the methods and systems of the present disclosure.
Figure 8B:
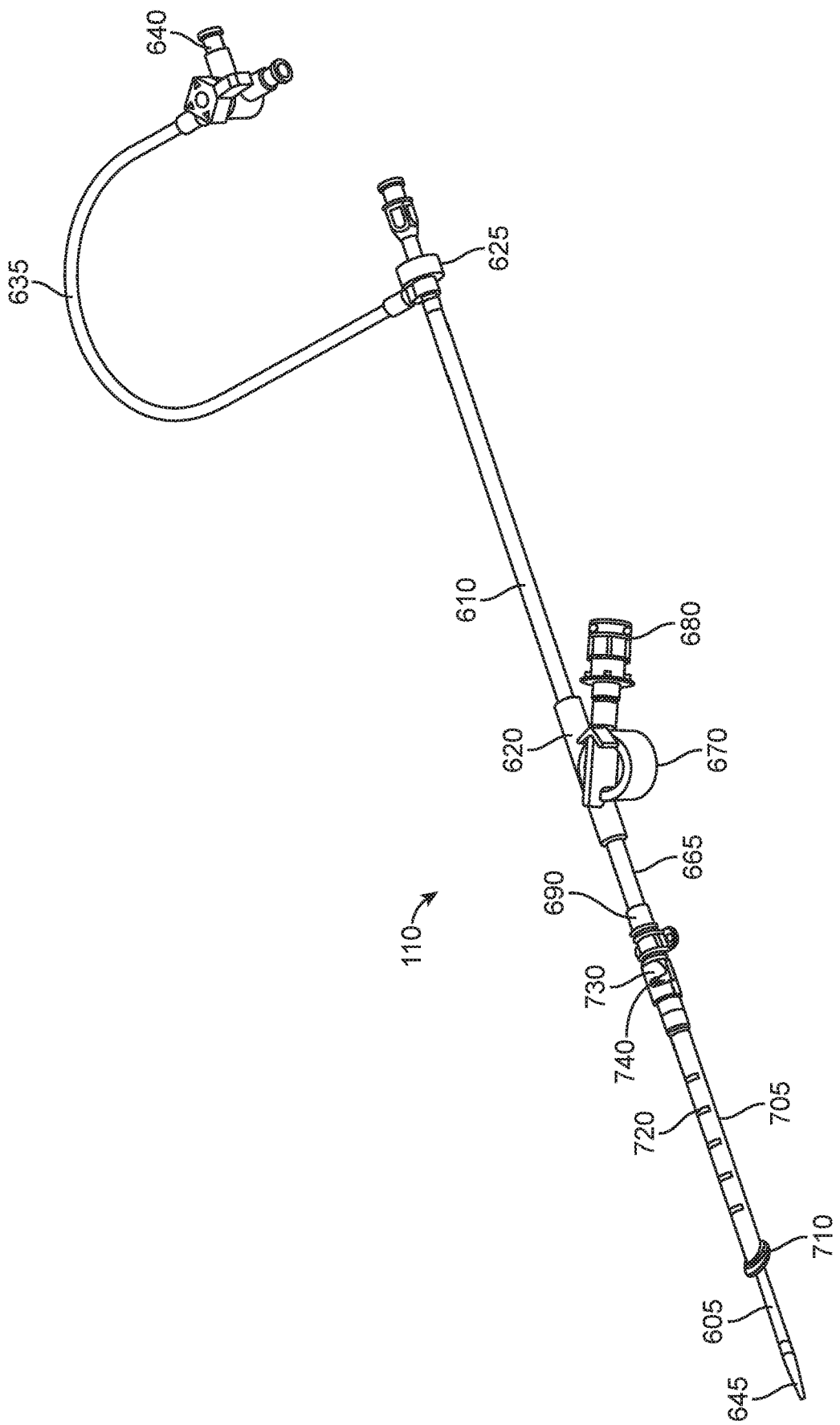
Figure 9A:
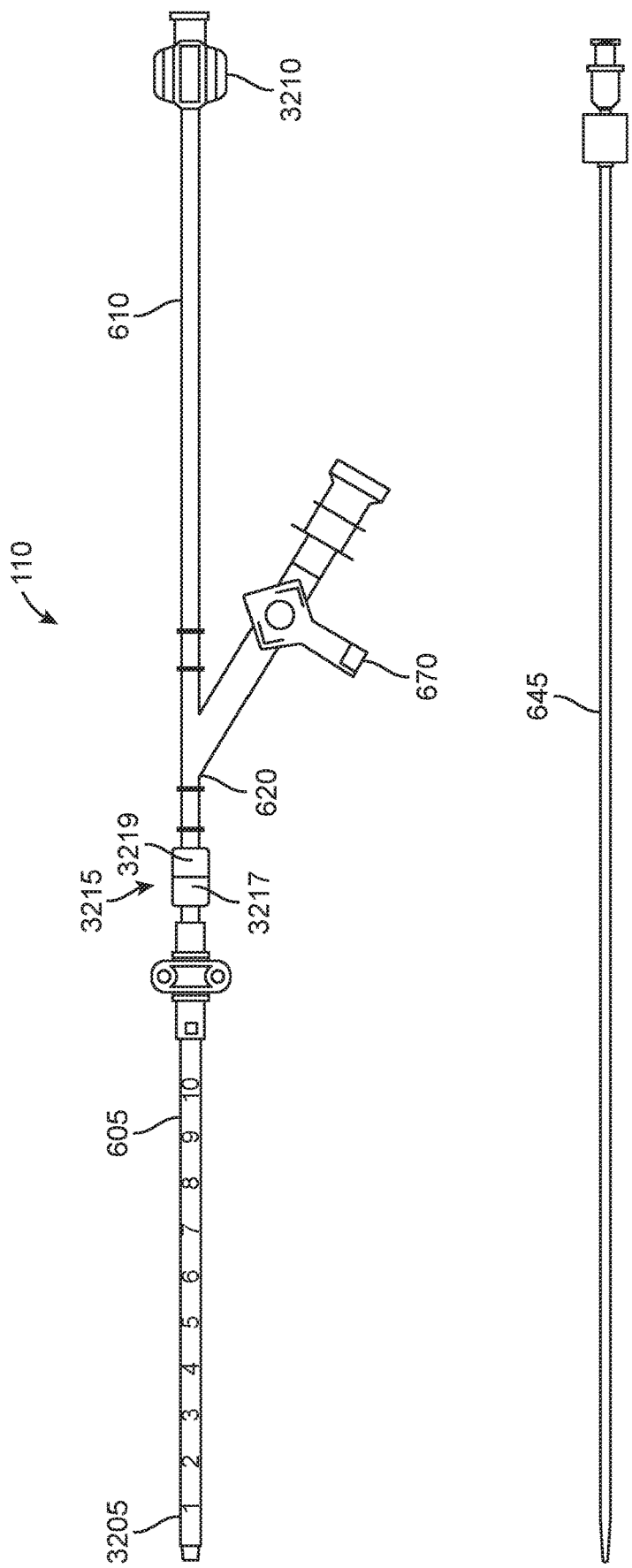
Figure 9B:
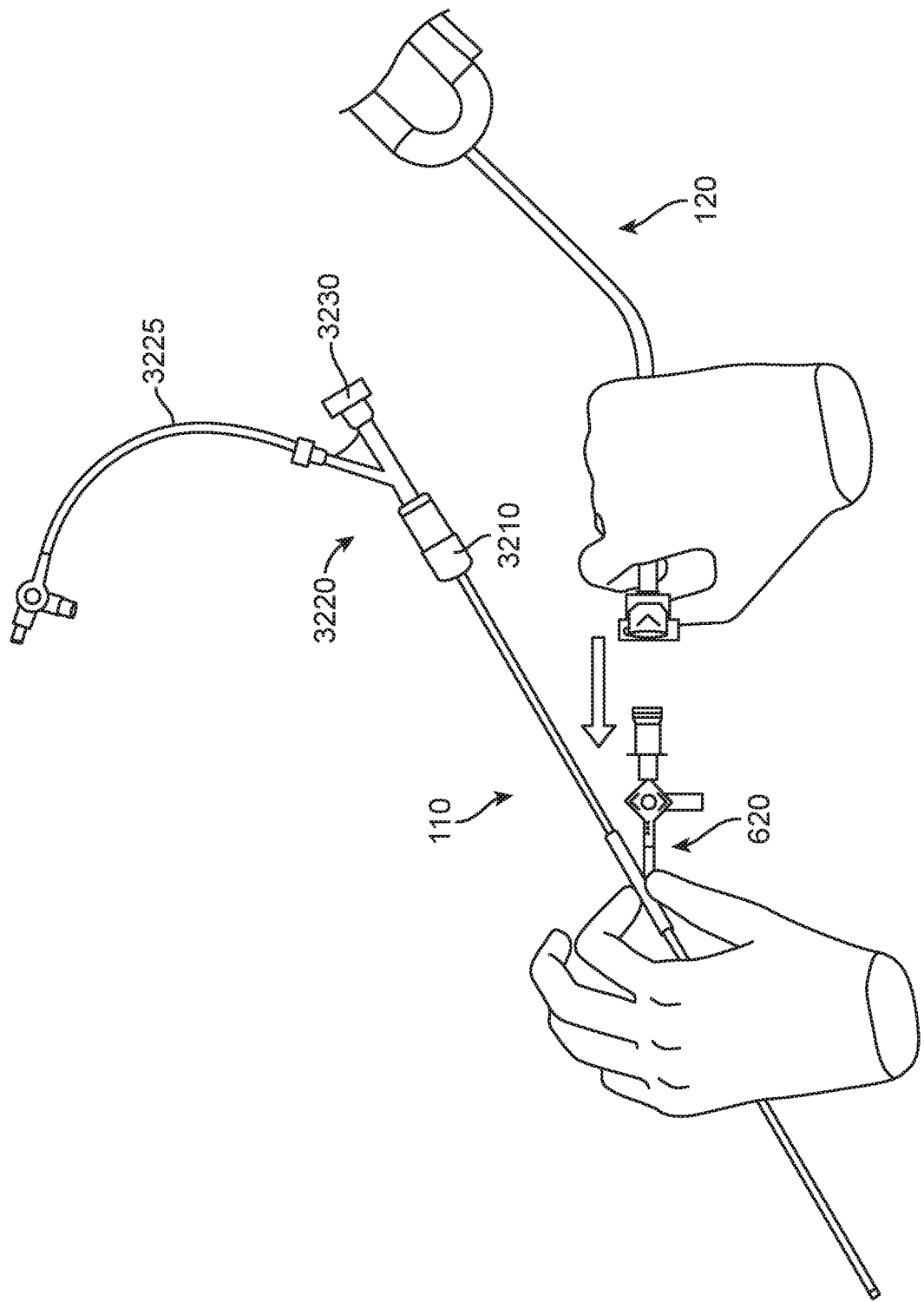

FIGS. 8A and 8B show an exemplary embodiment of the arterial access device 110, which comprises a distal sheath 605 (also referred to a sheath body 605), a proximal extension 610, and an adaptor or Y-connector 620 that can be fluidly attached to a flow line such as the shunt 120, such as shown in FIG. 9B. The arterial access device 110 can optionally include a sheath stopper 705 (described further below) and a guidewire 611.

The distal sheath 605 is the portion of the arterial access device 110 that is sized to be inserted into the carotid artery and is actually inserted into the artery during use. The distal sheath 605 is adapted to be introduced through an incision or puncture in a wall of a common carotid artery, either an open surgical incision or a percutaneous puncture established, for example, using the Seldinger technique. The length of the distal sheath can vary. In a non-limiting example, the length is 18 cm or greater. In another embodiment, the distal sheath is in the range from 5 to 15 cm, for example being from 10 cm to 12 cm. The inner diameter can be in the range from 7 Fr (1 Fr=0.33 mm), to 10 Fr, such 8 Fr. The distal sheath 605 can be a 4 Fr sheath, 6 Fr sheath, 5 Fr sheath, or 8 Fr sheath in non-limiting examples. In implementations, the distal sheath has an outer diameter of 4 Fr to 8 Fr, or up to 10.5 Fr or up to 12 Fr.

When the sheath is being introduced through the transcervical approach, above the clavicle but below the carotid bifurcation, it may be desirable that the sheath 605 be highly flexible while retaining hoop strength to resist kinking and buckling. Thus, the distal sheath 605 can be circumferentially reinforced, such as by braid, helical ribbon, helical wire, or the like. In an alternate embodiment, the distal sheath is adapted to be introduced through a percutaneous puncture into the femoral artery, such as in the groin, and up the aortic arch into the target common carotid artery CCA.

FIG. 8A shows the components of the arterial access device 110 in an exploded state including arterial access sheath 605, sheath dilator 645, sheath stopper 705, and sheath guidewire 111. FIG. 8B shows the arterial access device 110 as it would be assembled for insertion over the sheath guide wire 611 into the carotid artery. After the sheath is inserted into the artery and during the procedure, the sheath guide wire 611 and sheath dilator 705 are removed. A flush line 635 can be connected to the arterial access device 110 and can have a stopcock 640 at its proximal end. The flush-line 635 allows for the introduction of saline, contrast fluid, or the like, during the procedures. The flush line 635 can also allow pressure monitoring during the procedure. In an embodiment, the dilator 645 has a distal region that protrudes 1.5 cm distally past a distal end of a distal end of the sheath 605 when the dilator is positioned within the sheath.

The proximal extension 610 extends from a Y-adapter 620 to a proximal end of the arterial access device 110, such as at the location of the flush line 635 when present. The proximal extension 610 has an inner lumen that is fluidly contiguous with an inner lumen of the sheath body 605. The embodiment of FIG. 8A includes proximal hemostasis valve 625 at a proximal-most end of the arterial access device 110. In an embodiment described below with reference to FIG. 9A (or in any embodiment described herein), the arterial access device 110 does not include a hemostasis valve and can be removably coupled to a hemostasis valve. The hemostasis valve can also be eliminated from the embodiment of FIGS. 8A and 8B.

With reference still to FIG. 8A, the Y-adaptor 620 (also referred to as a Y-connector) connects the distal portion of the sheath body 605 to the proximal extension 610. The Y-connector 620 can also include a valve 670 that can be operated to open and close fluid connection to a connector or hub 680 that can be removably connected or otherwise at least partially form a flow line such as the shunt 120. That is, the hub connects to and forms at least a portion of the retrograde shunt 120 (FIGS. 5 and 6).

Figure 18A:
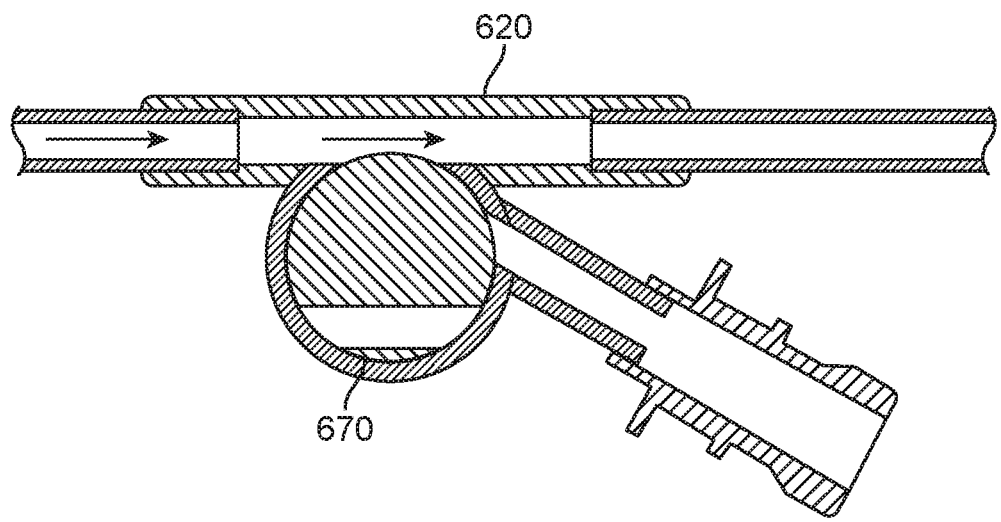
FIGS. 18A and 18B show details in cross section of an example Y-connector of the arterial access device.
Figure 18B:
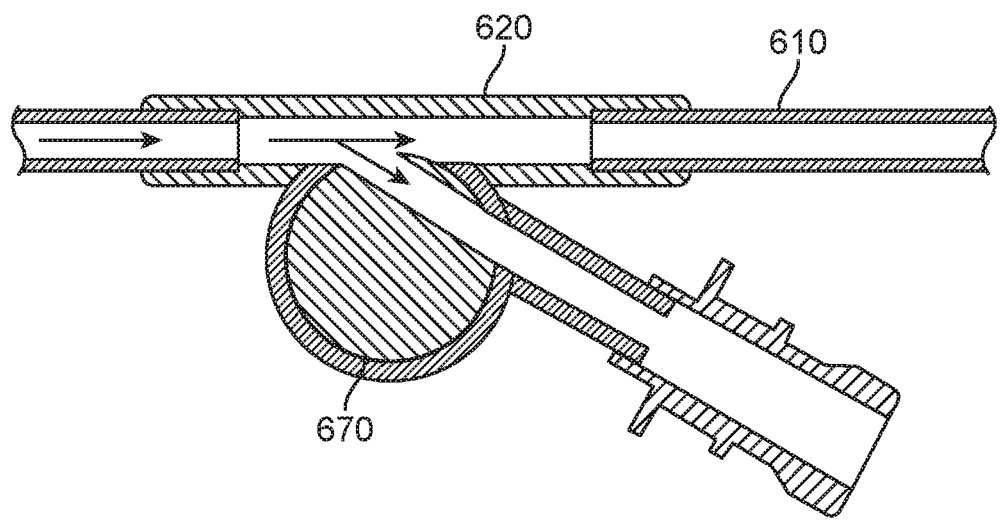

The valve 670 (such as a stopcock) is positioned immediately adjacent to an internal lumen of the Y-adaptor 620, which communicates with the internal lumen of the sheath body 605. FIGS. 18A and 18A show details in cross section of an example of the Y-connector 620 with the valve 670 and the hub 680. FIG. 18A shows the valve closed to the connector. This is the position that the valve would be in during prep of the arterial sheath. The valve is configured so that there is no potential for trapped air during prep of the sheath. FIG. 18B shows the valve open to the connector. This position is used once the flow shunt 120 is connected to hub 680 and allows blood flow from the arterial sheath into the shunt. This configuration eliminates the need to prep both a flush line and flow line, instead allowing prep from the single flush line 635 and stopcock 640. This single-point prep is identical to prep of conventional introducer sheaths which do not have connections to shunt lines and is therefore more familiar and convenient to the user. In addition, the lack of flow line on the sheath makes handling of the arterial sheath easier during prep and insertion into the artery.

With reference again to FIG. 8A, the sheath body 605 may also contain a second more distal connector 690, which is separated from the Y-adaptor 620 by a segment of tubing 665. A purpose of this second connector and the tubing 665 is to allow the valve 670 to be positioned further proximal from the distal tip of the sheath, while still limiting the length of the insertable portion of the sheath 605, and therefore allow a reduced level of exposure of the user to the radiation source as the flow shunt is connected to the arterial sheath during the procedure. In an embodiment, the distal connector 690 contains suture eyelets to aid in securement of the sheath to the patient once positioned.

In alternate implementations of any embodiment of the arterial access device 110 described herein, the arterial access device does not include a hemostasis valve on its proximal end. Rather the arterial access device has an open proximal end (such as an unimpeded or completely unblocked proximal opening) without a hemostasis valve to provide a wider access than would otherwise be present if the hemostasis valve was located there. In an embodiment, the proximal opening is sized to receive a 0.071 inch outer diameter catheter although this can vary.

FIG. 9A shows another embodiment of the arterial access device 110, which includes the sheath body 605 having one or more depth markers 3205 that are sized and spaced along the sheath body 605 to provide an indication to a user as to a depth of insertion of the sheath body 605 from a distal most edge of the sheath body to each depth marker 3205. In an embodiment, the depth markers are configured to provide an indication of depth up to at least 10 cm. In an embodiment, the sheath body 605 has a length of 18 cm, at least 18 cm, or less than 18 cm.

With reference still to FIG. 9A, the proximal extension 610 extends from a Y-adapter 620 to a proximal-most end where a connector element 3210, such as a female luer connector 3210, is located. As mentioned, a hemostasis valve is not located on the proximal-most end. The connector element 3210 can be configured to removably attach to a corresponding connector on the proximal end of the arterial access dilator 645. As shown in FIG. 9B, the connector element 3210 can be configured to removably attach to a rotating hemostasis valve (RHV) 3220 to achieve hemostasis. The RHV can include a Y-connector that includes a fluid line 3225 that communicates with a lumen of the arterial access device 110 when connected. The fluid line 3225 can serve as a flush line to be used for a flush fluid for example and can include an element to control flow such as a stopcock. As mentioned, the shunt 120 can be removably and fluidly coupled to the arterial access device 110 as shown in FIG. 9B. One or more suture eyelets can be located at a proximal end of the distal sheath 605.

The distal tip of the sheath body 605 can be entirely or at least partially made of a different material than a proximal portion of the sheath, such as of a softer or more flexible material. The distal tip of the sheath body 605 can define a distal-most edge wherein the edge is positioned along or aligned with a plane that is normal to a longitudinal axis of the sheath body. Or the distal tip of the sheath body 605 can define a distal-most edge wherein the edge is positioned along or aligned with a plane that is angled (i.e., not normal) to a longitudinal axis of the sheath body. In an embodiment, the sheath body 605 is a 6 French or an 8 French sheath. In an embodiment, the sheath body 605 has an inner diameter of 0.071 inch, 0.058 inch, or 0.045 inch and a length of 58 cm, although these specifications may vary.

With reference again to FIG. 9A, the proximal extension 610 (when present) is removably connected to distal sheath 605 via at least one coupler or connector 3215 assembly. The connector assembly 3215 can be positioned just proximal of a distal end of the distal sheath and distal of the Y-arm 620 at a connection site. In this embodiment, an additional hemostasis valve may be included at the connection site of the proximal extension 610 to the Y-arm connector 620, so that hemostasis is maintained when the proximal extension is not attached. Thus, the proximal extension 610 and the attached Y-connector 620 can be collectively detached from the distal sheath 605 at the location connector assembly 3215.

The connector assembly 3215 can include any of a wide variety of removably attachable connector components. The arterial access device 110 can include a first connector component 3217 on a proximal end of the distal sheath 605 that removably attaches to a second connector component 3219 on the distal end of y-arm adapter 620 or at a distal end of the proximal extension 610. The first connector component 3217 and second connector component 3219 can be, for example, rotational fittings that couple to one another via a rotational-type mechanism, such as threads. In an embodiment, the connector components comprise one or more Luer connectors. At least one of the connector components can be a hemostasis valve or a hemostasis valve adaptor. For example, the first connector component 3217 can be a hemostasis valve adaptor that is configured to removably attach to the second connector 3219. The first connector component 3217 can also removably attach to a hemostasis valve in an embodiment. Thus, the second connector component 3219 can be detached from the first connector component 3217 to remove the y-arm adapter 620 and the proximal extension 610. A hemostasis valve assembly can then be attached to the first connector 3217. In an embodiment, the first connector 3217 and/or the second connector 3219 include an automatic hemostasis component that automatically achieves hemostasis upon the first connector component being detached from the second connector component. In example embodiments, the arterial access sheath has a total length of less than 20 cm or less than 16 cm. In an embodiment, the length of the arterial access sheath has a working length of 11 cm and an outer diameter of 10.5 Fr.

In an embodiment, the arterial access device 110 has an entire length of 32 cm or greater. In an example embodiment, the entire length of the distal sheath 605 is 16 cm, 20 cm, or other length less than 32 cm. The detachable proximal extension 610 (which also detaches the Y-arm connector or adapter 620, which connects to the shunt 120) permits a reduction in length of the arterial access device 110 when the proximal extension 610 is detached from the distal sheath 605. In an example method, the arterial access device is used pursuant to a treatment method with the arterial access device 110 being in a fully assembled state such that it includes both the proximal extension 110 and the attached distal sheath 605. In this state, the arterial access device 110 can be used for the introduction of one or more interventional devices into the vasculature by inserting the interventional device via a proximal opening at the proximal end of the proximal extension.

Figure 19A:
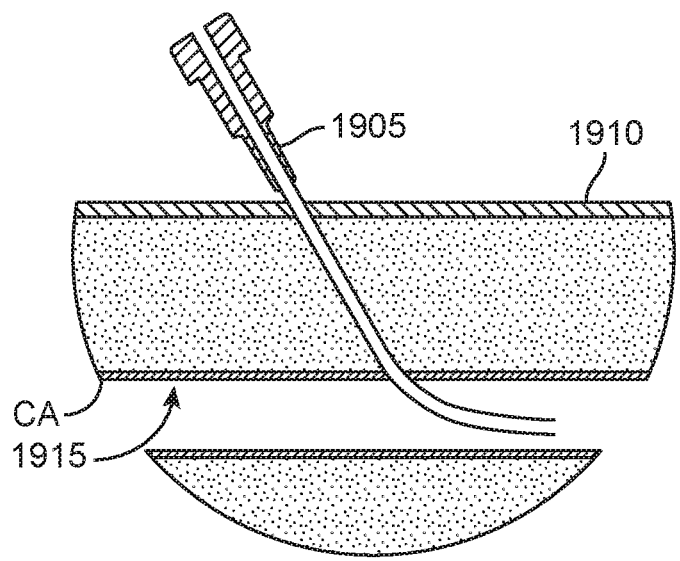
FIGS. 19A-19D show an example arterial closure system and method.

At some point during the method, such as after treatment via the interventional device is complete, the y-arm adapter 6220 and proximal extension 610 are detached from the distal sheath 605 (by uncoupling the second connector component 2319 from the first connector component 3217) while the distal sheath 605 remains inserted in the artery without the y-arm adapter 6220 and proximal extension 610. The distal sheath 605 thus provides a shorter access pathway into the artery relative to when the proximal extension 610 is attached to the distal sheath 605. The shorter access pathway may then be used to insert one or more devices for accessing and/or intervening with the artery without having to remove the entire arterial access device 110 and replace it with a shorter access device. In an embodiment, the distal sheath 605 is used as an access pathway for inserting a closure delivery system into the artery such as the closure delivery system described below relative to FIGS. 19A and 19B. A closure device can then be applied to achieve hemostasis at the access location. The distal sheath 605 can then be removed. Or the proximal extension may be re-attached to the distal sheath 605 prior to removal. In an embodiment, the shorter access pathway enables insertion and use of one or more devices for accessing and/or intervening with the artery than would otherwise be permissible if the longer access pathway with both the distal sheath and proximal extension were in an attached state.

FIGS. 10A-10B show alternate embodiment of the arterial access device 110. The distal sheath 605 can optionally have a stepped or other configuration having a reduced diameter distal region 630, as shown in FIG. 10B, which shows an enlarged view of the distal region 630 of the sheath 605. The distal region 630 of the sheath can be sized for insertion into the carotid artery, typically having an inner diameter in the range from 2.16 mm (0.085 inch) to 2.92 mm (0.115 inch) with the remaining proximal region of the sheath having larger outside and luminal diameters, with the inner diameter typically being in the range from 2.794 mm (0.110 inch) to 3.43 mm (0.135 inch). The larger luminal diameter of the proximal region minimizes the overall flow resistance through the sheath. In an embodiment, the reduced-diameter distal section 630 has a length of approximately 2 cm to 4 cm or 3 cm to 5 cm. In another embodiment, the length of the reduced-diameter distal section 630 has a length of approximately 10 cm to 15 cm. The relatively short length of the reduced-diameter distal section 630 permits this section to be positioned in the common carotid artery CCA via the transcervical approach with reduced risk that the distal end of the sheath 605 will contact the bifurcation B. Moreover, the reduced diameter section 630 also permits a reduction in size of the arteriotomy for introducing the sheath 605 into the artery while having a minimal impact in the level of flow resistance.

With reference again to FIG. 10A, the proximal extension 610 has an inner lumen that is fluidly contiguous with an inner lumen of the sheath 605. The respective lumens of the proximal extension 610 and sheath body 605 are joined by the Y-connector 620 which also connects a lumen of a flow line 615 to the sheath. In the assembled system, the flow line 615 connects to and forms a first leg of the retrograde shunt 120 (FIGS. 5 and 6). In any embodiment, the proximal extension 610 can have a length sufficient to space a proximal hemostasis valve 625 (or proximal end of the arterial access device) well away from the Y-connector 620, which is adjacent to the percutaneous or surgical insertion site. By spacing the hemostasis valve 625 away from a percutaneous insertion site, the physician can introduce an interventional system (such as a stent delivery system or other working catheter) into the proximal extension 610 and sheath 605 while staying out of the fluoroscopic field when fluoroscopy is being performed.

The dilator 645, which may have a tapered distal end 650, can be provided to facilitate introduction of the distal sheath 605 into the common carotid artery. The dilator 645 can be introduced through the hemostasis valve 625 so that the tapered distal end 650 extends through the distal end of the sheath 605, as best seen in FIG. 11A. The dilator 645 can have a central lumen to accommodate a guide wire. Typically, the guide wire is placed first into the vessel, and the dilator/sheath combination travels over the guide wire as it is being introduced into the vessel.

The dilator can vary in length. In an embodiment, the dilator has a length such that tapered distal end 650 as well as a distal region of the dilator protrudes outwardly from a distal end of the distal sheath 605 when the dilator is positioned within the internal lumen of the distal sheath 605. In example embodiments, the length of the dilator is 79 cm with a working length of 76 cm although the length may vary.

Sheath Stopper

Optionally, a sheath stopper 705 such as in the form of a tube may be provided which is coaxially received over the exterior of the distal sheath 605, also as seen in FIG. 11A. The sheath stopper 705 is configured to act as a mechanical device to prevent the sheath from being inserted too far into the vessel. The sheath stopper 705 is sized and shaped to be positioned over the sheath body 605 such that it covers a portion of the sheath body 605 and leaves a distal portion of the sheath body 605 exposed. The sheath stopper 705 may have a flared proximal end 710 that engages the adapter 620, and a distal end 715. Optionally, the distal end 715 may be beveled, as shown in FIG. 11B.

The sheath stopper 705 may serve various purposes. For example, the length of the sheath stopper 705 limits the introduction of the sheath 605 to the exposed distal portion of the sheath 605 such that the sheath insertion length is limited to the exposed distal portion of the sheath. In an embodiment, the sheath stopper limits the exposed distal portion to a range between 2 and 3 cm. In an embodiment, the sheath stopper limited the exposed distal portion to 2.5 cm. In other words, the sheath stopper may limit insertion of the sheath into the artery to a range between about 2 and 3 cm or to 2.5 cm. In another example, the sheath stopper 705 can engage a pre-deployed puncture closure device disposed in the carotid artery wall, if present, to permit the sheath 605 to be withdrawn without dislodging the closure device.

The sheath stopper 705 may be manufactured from clear material so that the sheath body may be clearly visible underneath the sheath stopper 705. The sheath stopper 705 may also be made from flexible material, or the sheath stopper 705 include articulating or sections of increased flexibility so that it allows the sheath to bend as needed in a proper position once inserted into the artery. The sheath stopper may be plastically bendable such that it can be bent into a desired shape such that it retains the shape when released by a user. The distal portion of the sheath stopper may be made from stiffer material, and the proximal portion may be made from more flexible material. In an embodiment, the stiffer material is 85 A durometer and the more flexible section is 50 A durometer. In an embodiment, the stiffer distal portion is 1 to 4 cm of the sheath stopper 705. The sheath stopper 705 may be removable from the sheath so that if the user desired a greater length of sheath insertion, the user could remove the sheath stopper 705, cut the length (of the sheath stopper) shorter, and re-assemble the sheath stopper 705 onto the sheath such that a greater length of insertable sheath length protrudes from the sheath stopper 705.

Figure 11C:
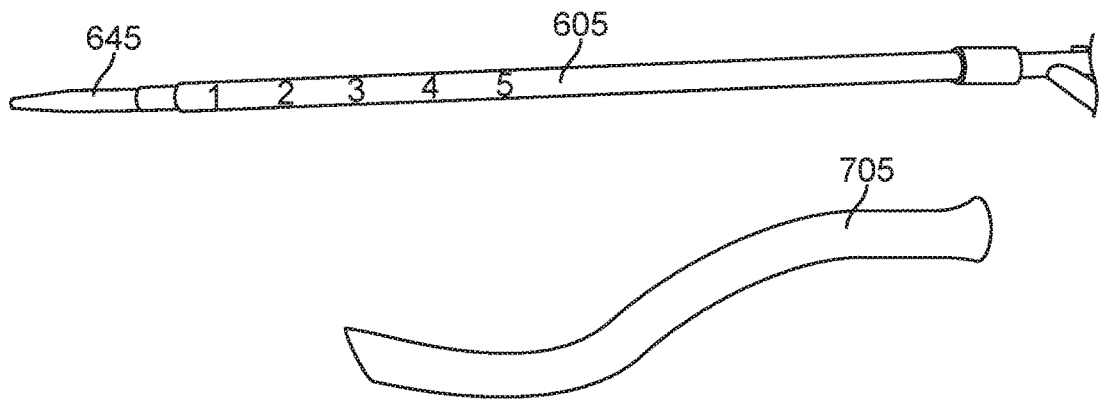
FIGS. 11C-11G show other embodiments of the sheath stopper tube.
Figure 11D:
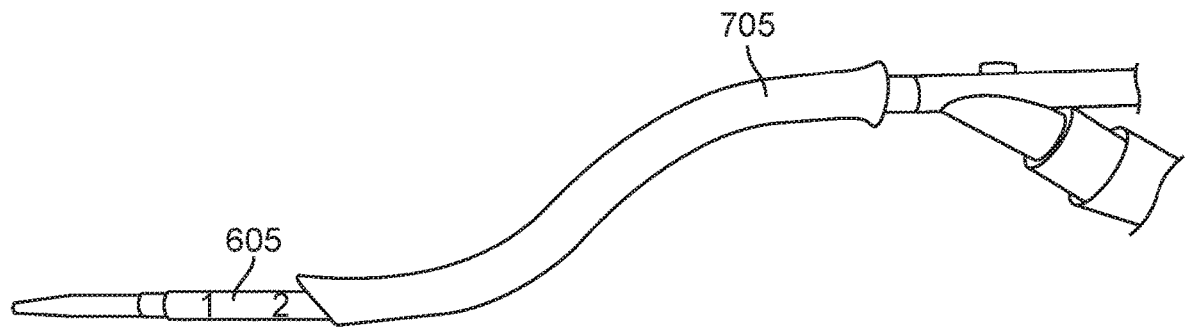

FIG. 11C shows another embodiment of a sheath stopper 705 positioned adjacent a sheath 605 with a dilator 645 positioned therein. The sheath stopper 705 of FIG. 11C may be deformed from a first shaped, such as a straight shape, into a second different from the first shape wherein the sheath stopper retains the second shape until a sufficient external force acts on the sheath stopper to change its shape. The second shape may be for example non-straight, curved, or an otherwise contoured or irregular shape. For example, FIG. 11C shows the sheath stopper 705 having multiple bends as well as straight sections. FIG. 11C shows just an example and it should be appreciated that the sheath stopper 705 may be shaped to have any quantity of bends along its longitudinal axis. FIG. 11D shows the sheath stopper 705 positioned on the sheath 605. The sheath stopper 705 has a greater stiffness than the sheath 605 such that the sheath 605 takes on a shape or contour that conforms to the shape of contour of the sheath stopper 705.

Figure 11E:
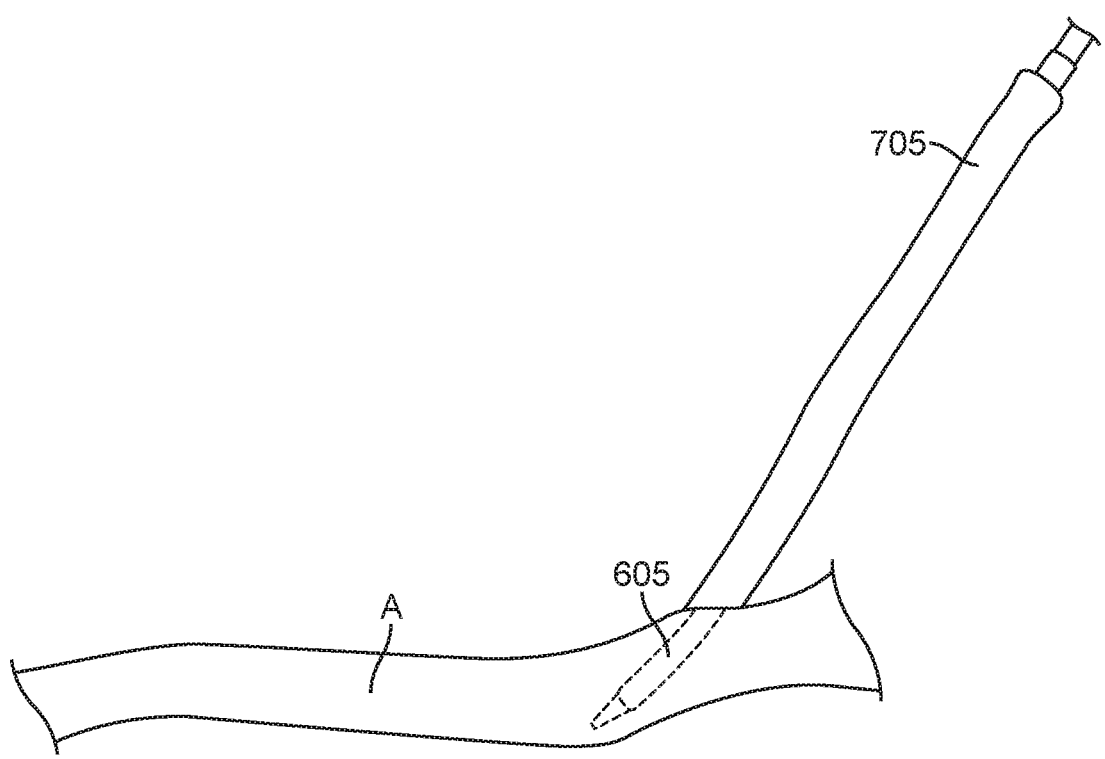
Figure 11F:
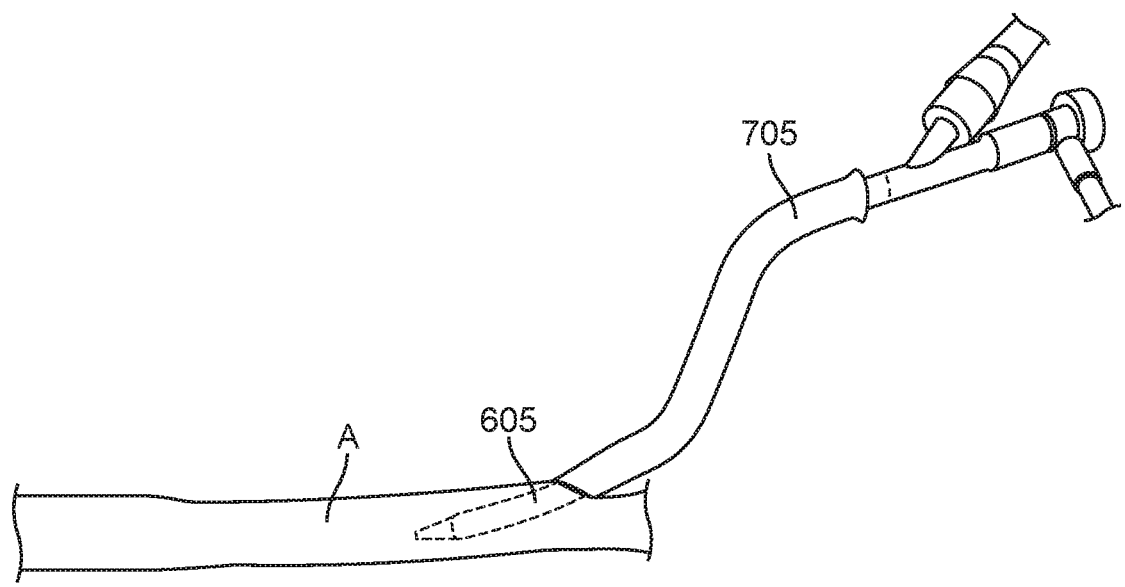

The sheath stopper 705 may be shaped according to an angle of the sheath insertion into the artery and the depth of the artery or body habitus of the patient. This feature reduces the force of the sheath tip in the blood vessel wall, especially in cases where the sheath is inserted at a steep angle into the vessel. The sheath stopper may be bent or otherwise deformed into a shape that assists in orienting the sheath coaxially with the artery being entered even if the angle of the entry into the arterial incision is relatively steep. The sheath stopper may be shaped by an operator prior to sheath insertion into the patient. Or, the sheath stopper may be shaped and/or re-shaped in situ after the sheath has been inserted into the artery. FIGS. 11E and 11F show an example of the malleable sheath stopper 705 in use. FIG. 11E shows the sheath stopper 705 positioned on the sheath 605 with the sheath stopper 705 in a straight shape. The sheath 605 takes on the straight shape of the sheath stopper 705 and is entering the artery A at a relatively steep angle such that the distal tip of the sheath 605 abuts or faces the wall of the artery. In FIG. 11F, a user has bent the sheath stopper 705 so as to adjust the angle of entry of the sheath 605 so that the longitudinal axis of the sheath 605 is more aligned with the axis of the artery A. In this manner, the sheath stopper 705 has been formed by a user into a shape that assists in directing the sheath 605 away from the opposing wall of the artery A and into a direction that is more coaxial with the axis of the artery A relative to the shape in FIG. 11E.

In an embodiment, the sheath stopper 705 is made from malleable material, or with an integral malleable component positioned on or in the sheath stopper. In another embodiment, the sheath stopper is constructed to be articulated using an actuator such as concentric tubes, pull wires, or the like. The wall of the sheath stopper may be reinforced with a ductile wire or ribbon to assist it in holding its shape against external forces such as when the sheath stopper encounters an arterial or entryway bend. Or the sheath stopper may be constructed of a homogeneous malleable tube material, including metal and polymer. The sheath stopper body may also be at least partially constructed of a reinforced braid or coil capable of retaining its shape after deformation.

Another sheath stopper embodiment is configured to facilitate adjustment of the sheath stopper position (relative to the sheath) even after the sheath is positioned in the vessel. One embodiment of the sheath stopper includes a tube with a slit along most or all of the length, so that the sheath stopper can be peeled away from the sheath body, moved forward or backwards as desired, and then re-positioned along the length of the sheath body. The tube may have a tab or feature on the proximal end so it may be grasped and more easily to peel away.

In another embodiment, the sheath stopper is a very short tube (such as a band), or ring that resides on the distal section of the sheath body. The sheath stopper may include a feature that could be grasped easily by forceps, for example, and pulled back or forwards into a new position as desired to set the sheath insertion length to be appropriate for the procedure. The sheath stopper may be fixed to the sheath body through either friction from the tube material, or a clamp that can be opened or closed against the sheath body. The clamp may be a spring-loaded clamp that is normally clamped onto the sheath body. To move the sheath stopper, the user may open the clamp with his or her fingers or an instrument, adjust the position of the clamp, and then release the clamp. The clamp is designed not to interfere with the body of the sheath.

In another embodiment, the sheath stopper includes a feature that allows suturing the sheath stopper and sheath to the tissue of the patient, to improve securement of the sheath and reduce risk of sheath dislodgement. The feature may be suture eyelets that are attached or molded into the sheath stopper tube.

In another embodiment, as shown in FIG. 8A, the sheath stopper 705 includes a distal flange 710 sized and shaped to distribute the force of the sheath stopper over a larger area on the vessel wall and thereby reduce the risk of vessel injury or accidental insertion of the sheath stopper through the arteriotomy and into the vessel. The flange 710 may have a rounded shape or other atraumatic shape that is sufficiently large to distribute the force of the sheath stopper over a large area on the vessel wall. In an embodiment, the flange is inflatable or mechanically expandable. For example, the arterial sheath and sheath stopper may be inserted through a small puncture in the skin into the surgical area, and then expanded prior to insertion of the sheath into the artery.

The sheath stopper may include one or more cutouts or indents 720 along the length of the sheath stopper which are patterned in a staggered configuration such that the indents increase the bendability of the sheath stopper while maintaining axial strength to allow forward force of the sheath stopper against the arterial wall. The indents may also be used to facilitate securement of the sheath to the patient via sutures, to mitigate against sheath dislodgement. The sheath stopper may also include a connector element 730 on the proximal end which corresponds to features on the arterial sheath such that the sheath stopper can be locked or unlocked from the arterial sheath. For example, the connector element is a hub with generally L-shaped slots 740 that correspond to pins 750 on the hub to create a bayonet mount-style connection. In this manner, the sheath stopper can be securely attached to the hub to reduce the likelihood that the sheath stopper will be inadvertently removed from the hub unless it is unlocked from the hub.

The distal sheath 605 can be configured to establish a curved transition from a generally anterior-posterior approach over the common carotid artery to a generally axial luminal direction within the common carotid artery. Arterial access through the common carotid arterial wall either from a direct surgical cut down or a percutaneous access may require an angle of access that is typically larger than other sites of arterial access. This is due to the fact that the common carotid insertion site is much closer to the treatment site (i.e., carotid bifurcation) than from other access points. A larger access angle may be needed to increase the distance from the insertion site to the treatment site to allow the sheath to be inserted at an adequate distance without the sheath distal tip reaching the carotid bifurcation. For example, the sheath insertion angle is typically 30-45 degrees or even larger via a transcarotid access, whereas the sheath insertion angle may be 15-20 degrees for access into a femoral artery. Thus the sheath must take a greater bend than is typical with introducer sheaths, without kinking and without causing undue force on the opposing arterial wall. In addition, the sheath tip desirably does not be abut or contact the arterial wall after insertion in a manner that would restrict flow into the sheath. The sheath insertion angle is defined as the angle between the luminal axis of the artery and the longitudinal axis of the sheath.

The sheath body 605 can be formed in a variety of ways to allow for this greater bend required by the angle of access. For example, the sheath and/or the dilator may have a combined flexible bending stiffness less than typical introducer sheaths. In an embodiment, the sheath/dilator combination (i.e., the sheath with the dilator positioned inside the sheath) has a combined flexible stiffness (E*I) in the range of about 80 and 100 N-m$^2 \times 10^{-6}$, where E is the elastic modulus and I is the area moment of inertia of the device. The sheath alone may have a bending stiffness in the range of about 30 to 40 N-m$^2 \times 10^{-6}$ and the dilator alone has a bending stiffness in the range of about 40 to 60 N-m$^2 \times 10^{-6}$. Typical sheath/dilator bending stiffnesses are in the range of 150 to 250 N-m$^2 \times 10^{-6}$. The greater flexibility may be achieved through choice of materials or design of the reinforcement. For example, the sheath may have a ribbon coil reinforcement of stainless steel with dimensions 0.002" to 0.003" thick and 0.005" to 0.015" width, and with outer jacket durometer of between 40 and 55 D. In an embodiment, the coil ribbon is 0.003"×0.010", and the outer jacket durometer is 45 D. In an embodiment, the sheath 605 can be pre-shaped to have a curve or an angle some set distance from the tip, typically 0.5 to 1 cm. The pre-shaped curve or angle can typically provide for a turn in the range from 5° to 90°, preferably from 10° to 30°. For initial introduction, the sheath 605 can be straightened with an obturator or other straight or shaped instrument such as the dilator 645 placed into its lumen. After the sheath 605 has been at least partially introduced through the percutaneous or other arterial wall penetration, the obturator can be withdrawn to allow the sheath 605 to reassume its pre-shaped configuration into the arterial lumen. To retain the curved or angled shape of the sheath body after having been straightened during insertion, the sheath may be heat set in the angled or curved shape during manufacture. Alternately, the reinforcement structure may be constructed out of nitinol and heat shaped into the curved or angled shape during manufacture. Alternately, an additional spring element may be added to the sheath body, for example a strip of spring steel or nitinol, with the correct shape, added to the reinforcement layer of the sheath.

Other sheath configurations include having a deflection mechanism such that the sheath can be placed and the catheter can be deflected in situ to the desired deployment angle. In still other configurations, the catheter has a non-rigid configuration when placed into the lumen of the common carotid artery. Once in place, a pull wire or other stiffening mechanism can be deployed in order to shape and stiffen the sheath into its desired configuration. One particular example of such a mechanism is commonly known as "shape-lock" mechanisms as well described in medical and patent literature.

Another sheath configuration comprises a curved dilator inserted into a straight but flexible sheath, so that the dilator and sheath are curved during insertion. The sheath is flexible enough to conform to the anatomy after dilator removal.

Figure 11G:
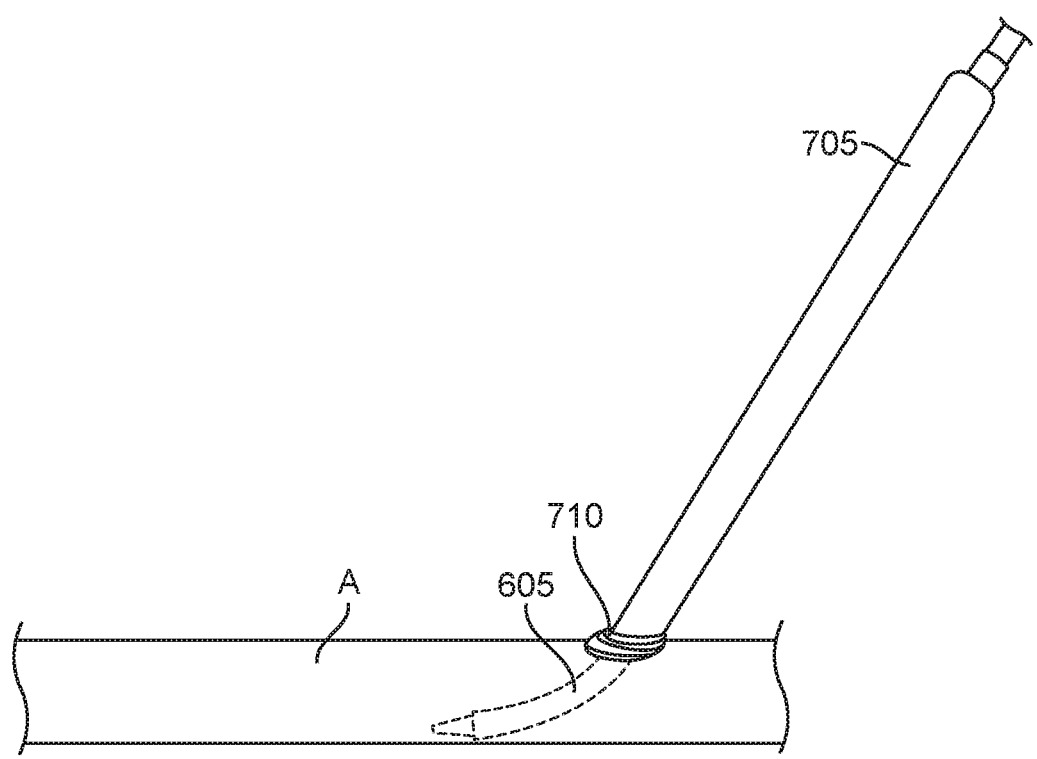

Another sheath embodiment is a sheath that includes one or more flexible distal sections, such that once inserted and in the angled configuration, the sheath is able to bend at a large angle without kinking and without causing undue force on the opposing arterial wall. In one embodiment, there is a distalmost section of sheath body 605 which is more flexible than the remainder of the sheath body. For example, the flexural stiffness of the distalmost section is one half to one tenth the flexural stiffness of the remainder of the sheath body 605. In an embodiment, the distalmost section has a flexural stiffness in the range 30 to 300 N-mm$^2$ and the remaining portion of the sheath body 605 has a flexural stiffness in the range 500 to 1500 N-mm$^2$, For a sheath configured for a CCA access site, the flexible, distal most section comprises a significant portion of the sheath body which may be expressed as a ratio. In an embodiment, the ratio of length of the flexible, distalmost section to the overall length of the sheath body is at least one tenth and at most one half the length of the entire sheath body. This change in flexibility may be achieved by various methods. For example, the outer jacket may change in durometer and/or material at various sections. Alternately, the reinforcement structure or the materials may change over the length of the sheath body. In an embodiment, the distal-most flexible section ranges from 1 cm to 3 cm. In an embodiment with more than one flexible section, a less flexible section (with respect to the distal-most section) may be 1 cm to 2 cm from the distal-most proximal section. In an embodiment, the distal flexible section has a bending stiffness in the range of about 30 to 50 N-m$^2$×10$^{-6}$ and the less flexible section has a bending stiffness in the range of about 50 and 100 N-m$^2$×10$^{-6}$. In another embodiment, a more flexible section is located between 0.5 and 1.5 cm for a length of between 1 and 2 cm, to create an articulating section that allows the distal section of the sheath to align more easily with the vessel axis though the sheath enters the artery at an angle. These configurations with variable flexibility sections may be manufactured in several manners. For example the reinforced, less flexible section may vary such that there is stiffer reinforcement in the proximal section and more flexible reinforcement in the distal section or in the articulating section. In an embodiment, an outer-most jacket material of the sheath is 45 D to 70 D durometer in the proximal section and 80 A to 25 D in the distalmost section. In an embodiment, the flexibility of the sheath varies continuously along the length of the sheath body. FIG. 11G shows such a sheath inserted in the artery, with the flexible distal section allowing the sheath body to bend and the distal tip to be in general alignment with the vessel lumen. In an embodiment, the distal section is made with a more flexible reinforcement structure, either by varying the pitch of a coil or braid or by incorporating a cut hypotube with differing cut patterns. Alternately the distal section has a different reinforcement structure than the proximal section.

In an embodiment, the distal sheath tapered tip is manufactured from harder material than the distal sheath body. A purpose of this is to facilitate ease of sheath insertion by allowing for a smooth taper on the sheath and reduce the change of sheath tip distortion or ovalizing during and after sheath insertion into the vessel. In one example the distal tapered tip material is manufactured from a higher durometer material, for example a 60-72 D shore material. In another example, distal tip is manufactured from a separate material, for example HDPE, stainless steel, or other suitable polymers or metals. In an additional embodiment, the distal tip is manufactured from radiopaque material, either as an additive to the polymer material, for example tungsten or barium sulfate, or as an inherent property of the material (as is the case with most metal materials).

In another embodiment, the dilator 645 may also have variable stiffness. For example the tapered tip 650 of the dilator may be made from more flexible material than the proximal portion of the dilator, to minimize the risk of vessel injury when the sheath and dilator are inserted into the artery. In an embodiment, the distal flexible section has a bending stiffness in the range of about 45 to 55 N-m$^2$×10$^{-6}$ and a less flexible proximal section has a bending stiffness in the range of about 60 and 90 N-m$^2$×10$^{-6}$. The taper shape of the dilator may also be optimized for transcarotid access. For example, to limit the amount of sheath and dilator tip that enter the artery, the taper length and the amount of the dilator that extends past the sheath should be shorter than typical introducer sheaths. For example, the taper length may be 1 to 1.5 cm, and extend 1.5 to 2 cm from the end of the sheath body. In an embodiment, the dilator contains a radiopaque marker at the distal tip so that the tip position is easily visible under fluoroscopy.

In another embodiment, the introducer guide wire is optimally configured for transcarotid access. Typically, when inserting an introducer sheath into a vessel, an introducer guide wire is first inserted into the vessel. This may be done either with a micropuncture technique or a modified Seldinger technique. Usually there is a long length of vessel in the direction that the sheath is to be inserted into which an introducer guidewire may be inserted, for example into the femoral artery. In this instance, a user may introduce a guide wire between 10 and 15 cm or more into the vessel before inserting the sheath. The guide wire is designed to have a flexible distal section so as not to injure the vessel when being introduced into the artery. The flexible section of an introducer sheath guide wire is typically 5 to 6 cm in length, with a gradual transition to the stiffer section. Inserting the guide wire 10 to 15 cm means the stiffer section of the guide wire is positioned in the area of the puncture and allows a stable support for subsequent insertion of the sheath and dilator into the vessel. However, in the case of transcarotid sheath insertion into the common carotid artery, there is a limit on how much guide wire may be inserted into the carotid artery. In cases with carotid artery disease at the bifurcation or in the internal carotid artery, it is desirable to minimize the risk of emboli by inserting the wire into the external carotid artery (ECA), which would mean only about 5 to 7 cm of guide wire insertion, or to stop it before it reaches the bifurcation, which would be only 3 to 5 cm of guide wire insertion. Thus, a transcarotid sheath guidewire may have a distal flexible section of between 3 and 4 cm, and/or a shorter transition to a stiffer section. Alternately, a transcarotid sheath guidewire has an atraumatic tip section but have a very distal and short transition to a stiffer section. For example, the soft tip section is 1.5 to 2.5 cm, followed by a transition section with length from 3 to 5 cm, followed by a stiffer proximal segment, with the stiffer proximal section comprising the remainder of the wire.

In another embodiment, the sheath dilator is configured to be inserted over an 0.018" guide wire for transcarotid access. Standard sheath insertion using a micropuncture kit requires first insertion of an 0.018" guide wire through a 22 Ga needle, then exchange of the guide wire to an 0.035" or 0.038" guide wire using a micropuncture catheter, and finally insertion of the sheath and dilator over the 0.035" or 0.038" guide wire. A 0.014 inch guidewire can also be used. There exist sheaths which are insertable over a 0.018" guidewire, thus eliminating the need for the wire exchange. These sheaths, usually labeled "transradial" as they are designed for insertion into the radial artery, typically have a longer dilator taper, to allow an adequate diameter increase from the 0.018" wire to the body of the sheath. Unfortunately for transcarotid access, the length for sheath and dilator insertion is limited and therefore these existing sheaths are not appropriate. Another disadvantage is that the 0.018" guide wire may not have the support needed to insert a sheath with a sharper angle into the carotid artery. In the embodiment disclosed here, a transcarotid sheath system includes a sheath body, a sheath dilator, and an inner tube with a tapered distal edge that slidably fits inside the sheath dilator and can accommodate an 0.018" guide wire.

To use this sheath system embodiment, the 0.018" guide wire is first inserted into the vessel through a 22 Ga needle. The sheath system which is coaxially assembled is inserted over the 0.018" wire. The inner tube is first advanced over the 0.018" wire which essentially transforms it into the equivalent of an 0.035" or 0.038" guide wire in both outer diameter and mechanical support. It is locked down to the 0.018" wire on the proximal end. The sheath and dilator are then advanced over the 0.018" wire and inner tube into the vessel. This configuration eliminates the wire exchange step without the need for a longer dilator taper as with current transradial sheaths and with the same guide wire support as standard introducer sheaths. As described above, this configuration of sheath system may include stopper features which prevent inadvertent advancement too far of the 0.018" guide wire and/or inner tube during sheath insertion. Once the sheath is inserted, the dilator, inner tube, and 0.018" guide wire are removed.

FIG. 12A shows another embodiment of the arterial access device 110. This embodiment is substantially the same as the embodiment shown in FIG. 8A, except that the distal sheath 605 includes an occlusion element 129 for occluding flow through, for example the common carotid artery. Any of the embodiments of the arterial access device can include an occlusion element. If the occluding element 129 is an inflatable structure such as a balloon or the like, the sheath 605 can include an inflation lumen that communicates with the occlusion element 129. The occlusion element 129 can be an inflatable balloon, but it can also be an inflatable cuff, a conical or other circumferential element which flares outwardly to engage the interior wall of the common or internal carotid artery to block flow therepast, a membrane-covered braid, a slotted tube that radially enlarges when axially compressed, or similar structure which can be deployed by mechanical means, or the like. In the case of balloon occlusion, the balloon can be compliant, non-compliant, elastomeric, reinforced, or have a variety of other characteristics. In an embodiment, the balloon is an elastomeric balloon which is closely received over the exterior of the distal end of the sheath prior to inflation. When inflated, the elastomeric balloon can expand and conform to the inner wall of the common carotid artery. In an embodiment, the elastomeric balloon is able to expand to a diameter at least twice that of the non-deployed configuration, frequently being able to be deployed to a diameter at least three times that of the undeployed configuration, more preferably being at least four times that of the undeployed configuration, or larger.

As shown in FIG. 12B, the distal sheath 605 with the occlusion element 129 can have a stepped or other configuration having a reduced diameter distal region 630. The distal region 630 can be sized for insertion into the carotid artery with the remaining proximal region of the sheath 605 having larger outside and luminal diameters, with the inner diameter typically being in the range from 2.794 mm (0.110 inch) to 3.43 mm (0.135 inch). The larger luminal diameter of the proximal region minimizes the overall flow resistance of the sheath. In an embodiment, the reduced-diameter distal section 630 has a length of approximately 2 cm to 4 cm or 3 cm to 5 cm. In another embodiment, the length of the reduced-diameter distal section 630 has a length of approximately 10 cm to 15 cm. The relatively short length of the reduced-diameter distal section 630 permits this section to be positioned in the common carotid artery CCA via the transcervical approach with reduced risk that the distal end of the sheath 605 will contact the bifurcation B. In an alternate embodiment, shown in FIG. 28, the reduced diameter distal section 630 is tapered or stepped and has a length of approximately 10 cm to 15 cm, such that the distal tip can be positioned in the internal carotid artery ICA.

In a situation with a sharp sheath insertion angle and/or a short length of sheath inserted in the artery, such as one might see in a transcarotid access procedure, the distal tip of the sheath has a higher likelihood of being partially or totally positioned against the vessel wall, thereby restricting flow into the sheath. In an embodiment, the sheath is configured to center the tip in the lumen of the vessel. One such embodiment includes a balloon such as the occlusion element 129 described above. In another embodiment, a balloon may not be occlusive to flow but still center the tip of the sheath away from a vessel wall, like an inflatable bumper. In another embodiment, expandable features are situated at the tip of the sheath and mechanically expanded once the sheath is in place. Examples of mechanically expandable features include braided structures or helical structures or longitudinal struts which expand radially when shortened.

In an embodiment, occlusion of the vessel proximal to the distal tip of the sheath may be done from the outside of the vessel, as in a Rummel tourniquet or vessel loop proximal to sheath insertion site. In an alternate embodiment, an occlusion device may fit externally to the vessel around the sheath tip, for example an elastic loop, inflatable cuff, or a mechanical clamp that could be tightened around the vessel and distal sheath tip. In a system of flow reversal, this method of vessel occlusion minimizes the area of static blood flow, thereby reducing risk of thrombus formation, and also ensure that the sheath tip is axially aligned with vessel and not partially or fully blocked by the vessel wall.

In an embodiment, the distal portion of the sheath body could contain side holes so that flow into the sheath is maintained even if tip of sheath is partially or fully blocked by arterial wall.

Venous Return Device

Figure 13:
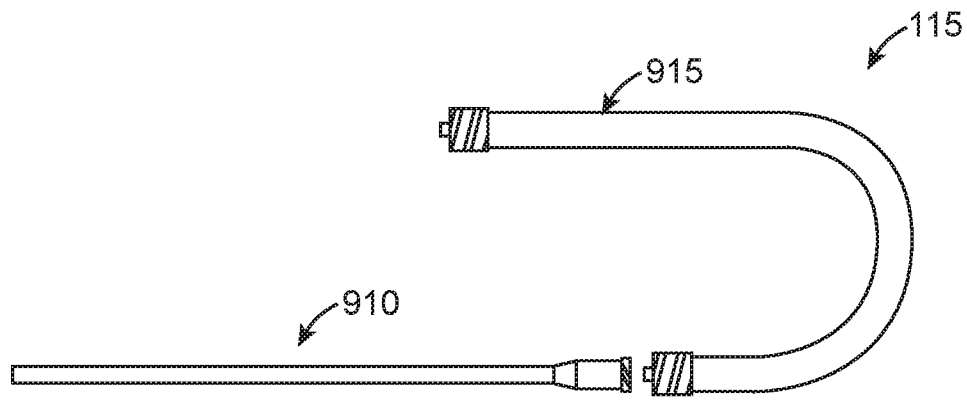
FIG. 13 illustrates a first embodiment of a venous return device useful in the methods and systems of the present disclosure.
Figure 14A:
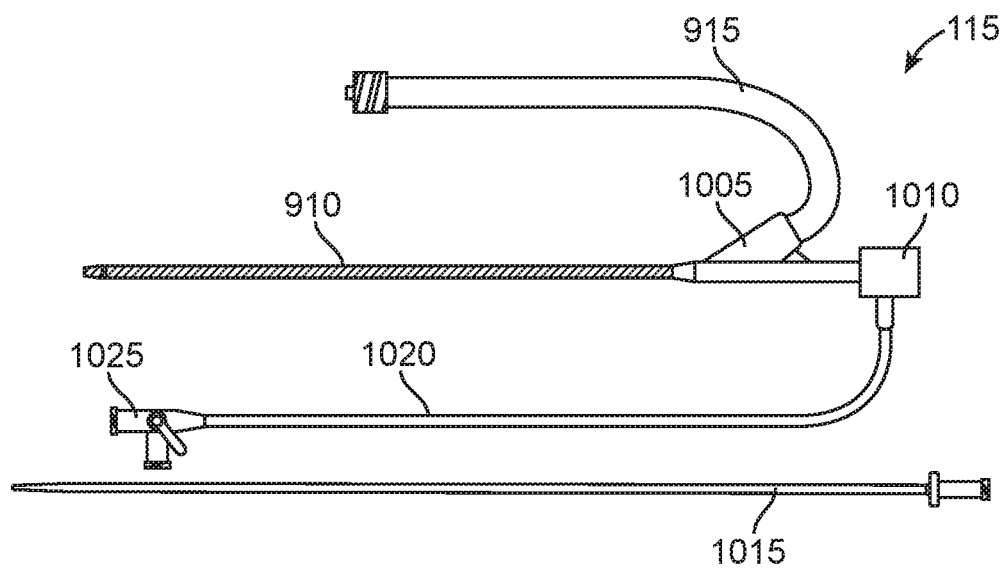
FIG. 14A-14C illustrate alternative venous return devices useful in the methods and systems of the present disclosure.

Referring now to FIG. 13, the venous return device 115 can comprise a distal sheath 910 and a flow line 915, which connects to and forms a leg of the shunt 120 when the system is in use. The distal sheath 910 is adapted to be introduced through an incision or puncture into a venous return location, such as the jugular vein or femoral vein. The distal sheath 910 and flow line 915 can be permanently affixed, or can be attached using a conventional luer fitting, as shown in FIG. 13. Optionally, as shown in FIG. 14A, the sheath 910 can be joined to the flow line 915 by a Y-connector 1005. The Y-connector 1005 can include a hemostasis valve 1010, permitting insertion of a dilator 1015 to facilitate introduction of the venous return device into the internal jugular vein or other vein. As with the arterial access dilator 645, the venous dilator 1015 includes a central guide wire lumen so the venous sheath and dilator combination can be placed over a guide wire. Optionally, the venous sheath 910 can include a flush line 1020 with a stopcock 1025 at its proximal or remote end.

Figure 14B:
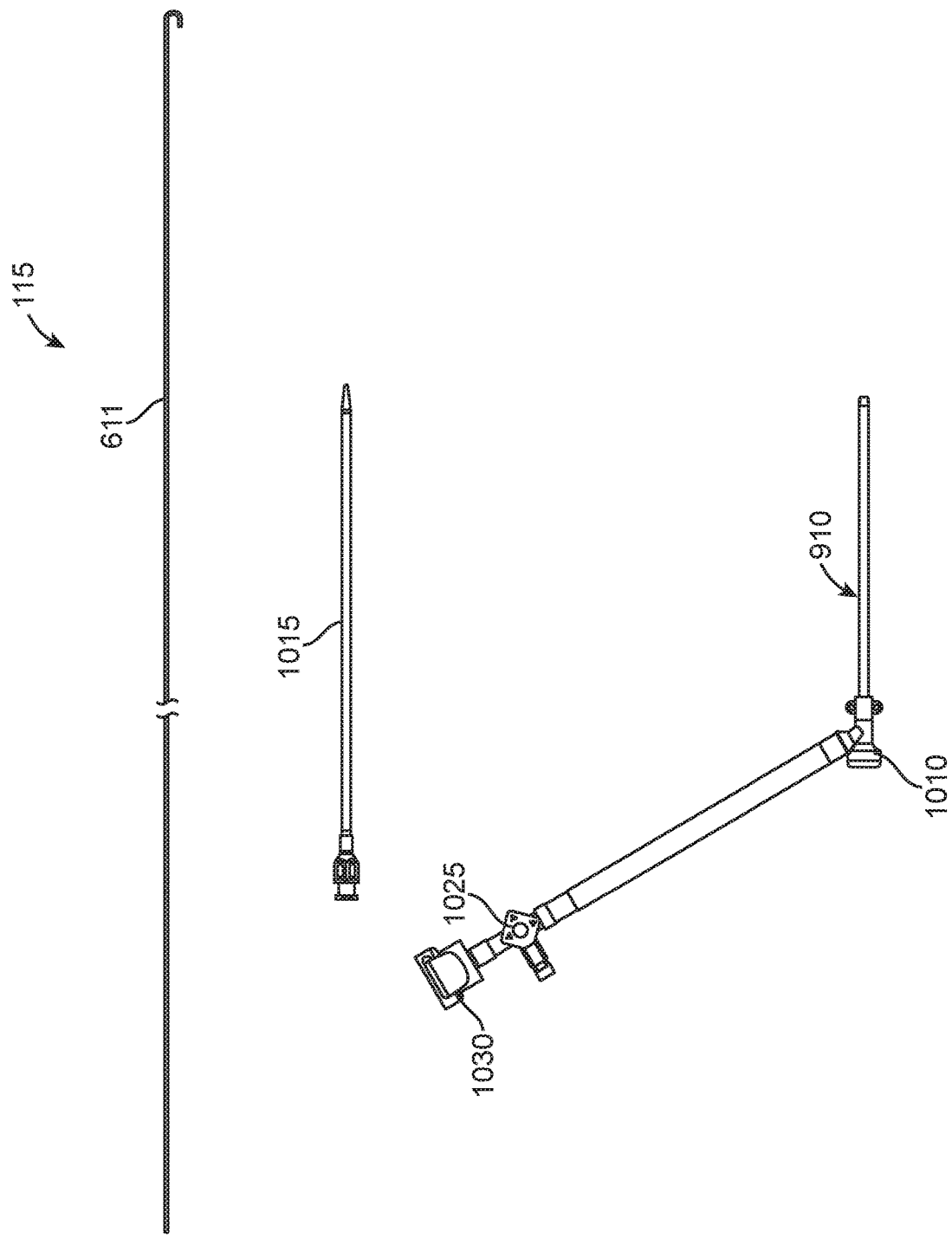
Figure 14C:
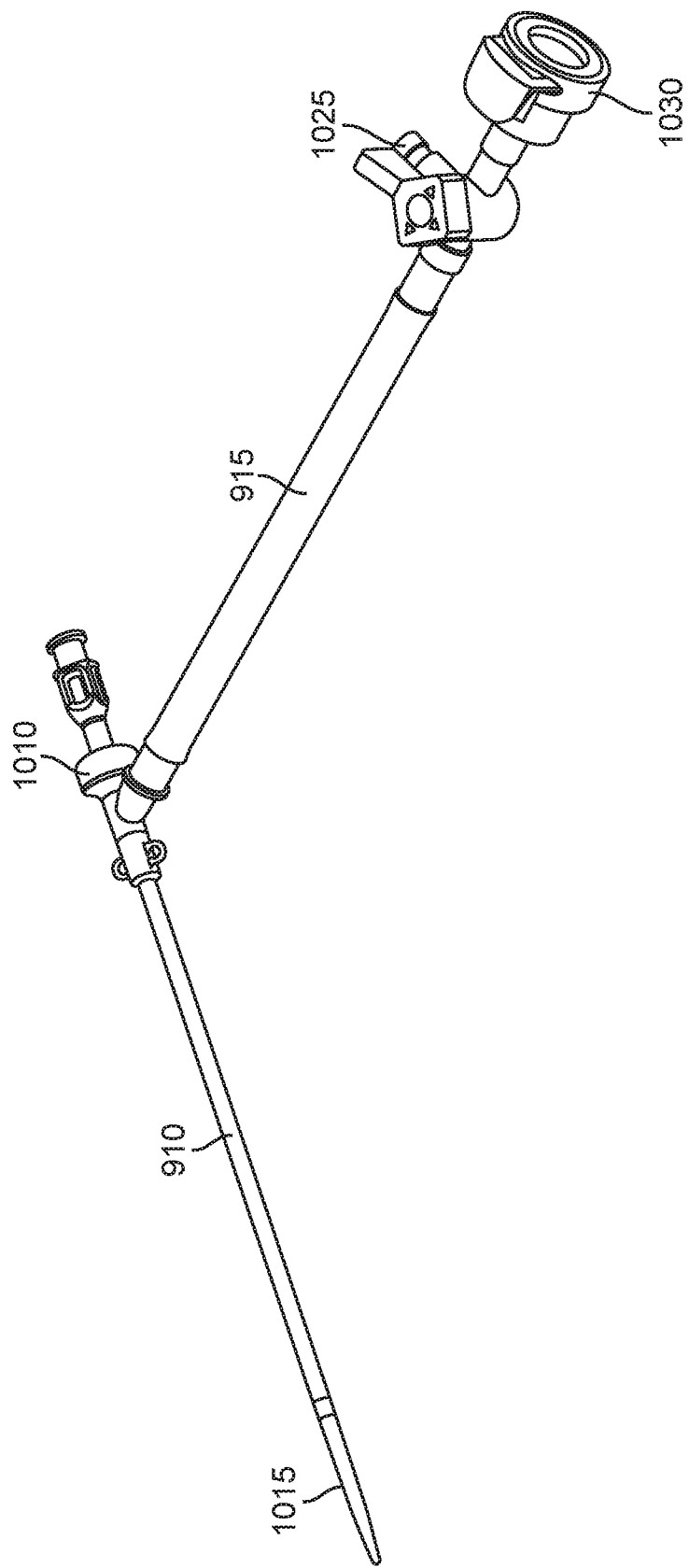

An alternate configuration is shown in FIGS. 14B and 14C. FIG. 14B shows the components of the venous return device 115 including venous return sheath 910, sheath dilator 1015, and sheath guidewire 611. FIG. 14C shows the venous return device 115 as it would be assembled for insertion over the sheath guide wire 611 into a central vein. Once the sheath is inserted into the vein, the dilator and guidewire are removed. The venous sheath can include a hemostastis valve 1010 and flow line 915. A stopcock 1025 on the end of the flow line allows the venous sheath to be flushed via the flow line prior to use. This configuration allows the sheath to be prepped from a single point, as is done with conventional introducer sheaths. Connection to the flow shunt 120 is made with a connector 1030 (such a hemostasis valve) on the stopcock 1025. The venous return device 115 can include one or more eyelets that can be used to couple to suture for securing the venous return device 115 to a patient.

In order to reduce the overall system flow resistance, the arterial access flow line 615 and Y-connector 620 (FIG. 8A) and the venous return flow line 915, and Y-connectors 1005 (FIG. 13 or 14), can each have a relatively large flow lumen inner diameter, typically being in the range from 2.54 mm (0.100 inch) to 5.08 mm (0.200 inch), and a relatively short length, typically being in the range from 10 cm to 20 cm. The low system flow resistance is desirable since it permits the flow to be maximized during portions of a procedure when the risk of emboli is at its greatest. The low system flow resistance also allows the use of a variable flow resistance for controlling flow in the system, as described in more detail below. The dimensions of the venous return sheath 910 can be generally the same as those described for the arterial access sheath 605 above. In the venous return sheath, an extension for the hemostasis valve 1010 is not required.

Retrograde Shunt or Flow Line

The shunt 120 can be formed of a single tube or multiple, connected tubes that provide fluid communication between the arterial access catheter 110 and the venous return catheter 115 to provide a pathway for retrograde blood flow therebetween. As shown in FIG. 5 and FIG. 6, the shunt 120 connects at one end to the flow line 615 of the arterial access device 110, and at an opposite end to the flow line 915 of the venous return catheter 115.

In an embodiment, the shunt 120 can be formed of at least one tube that communicates with the flow control assembly 125. The shunt 120 can be any structure that provides a fluid pathway for blood flow. The shunt 120 can have a single lumen or it can have multiple lumens. The shunt 120 can be removably attached to the flow control assembly 125, arterial access device 110, and/or venous return device 115. Prior to use, the user can select a shunt 120 with a length that is most appropriate for use with the arterial access location and venous return location. In an embodiment, the shunt 120 can include one or more extension tubes that can be used to vary the length of the shunt 120. The extension tubes can be modularly attached to the shunt 120 to achieve a desired length. The modular aspect of the shunt 120 permits the user to lengthen the shunt 120 as needed depending on the site of venous return. For example, in some patients, the internal jugular vein IJV is small and/or tortuous. The risk of complications at this site may be higher than at some other locations, due to proximity to other anatomic structures. In addition, hematoma in the neck may lead to airway obstruction and/or cerebral vascular complications. Consequently, for such patients it may be desirable to locate the venous return site at a location other than the internal jugular vein IJV, such as the femoral vein. A femoral vein return site may be accomplished percutaneously, with lower risk of serious complication, and also offers an alternative venous access to the central vein if the internal jugular vein IJV is not available. Furthermore, the femoral venous return changes the layout of the reverse flow shunt such that the shunt controls may be located closer to the "working area" of the intervention, where the devices are being introduced and the contrast injection port is located.

In an embodiment, the shunt 120 has an internal diameter of 4.76 mm (3/16 inch) and has a length of 40-70 cm. As mentioned, the length of the shunt can be adjusted or can vary from what is described herein.

In an embodiment, the shunt may contain a port which can be connected to an aspiration source such as a syringe, suction pump, or the like.

In an additional embodiment, the shunt may contain an element that connects to an active pump, for example a peristaltic pump, a diaphragm pump, an impeller pump, or a syringe pump.

Flow Control Assembly—Regulation and Monitoring of Retrograde Flow

The flow control assembly 125 interacts with the retrograde shunt 120 to regulate and/or monitor the retrograde flow rate from the common carotid artery to the venous return site, such as the internal jugular vein, or to the external receptacle. In this regard, the flow control assembly 125 enables the user to achieve higher maximum flow rates than existing systems and to also selectively adjust, set, or otherwise modulate the retrograde flow rate. Various mechanisms can be used to regulate the retrograde flow rate, as described more fully below. The flow control assembly 125 enables the user to configure retrograde blood flow in a manner that is suited for various treatment regimens, as described below.

In general, the ability to control the continuous retrograde flow rate allows the physician to adjust the protocol for individual patients and stages of the procedure. The retrograde blood flow rate will typically be controlled over a range from a low rate to a high rate. The high rate can be at least two fold higher than the low rate, typically being at least three fold higher than the low rate, and often being at least five fold higher than the low rate, or even higher. In an embodiment, the high rate is at least three fold higher than the low rate and in another embodiment the high rate is at least six fold higher than the low rate. While it is generally desirable to have a high retrograde blood flow rate to maximize the extraction of emboli from the carotid arteries, the ability of patients to tolerate retrograde blood flow will vary. Thus, by having a system and protocol which allows the retrograde blood flow rate to be easily modulated, the treating physician can determine when the flow rate exceeds the tolerable level for that patient and set the reverse flow rate accordingly. For patients who cannot tolerate continuous high reverse flow rates, the physician can chose to turn on high flow only for brief, critical portions of the procedure when the risk of embolic debris is highest. At short intervals, for example between 15 seconds and 1 minute, patient tolerance limitations are usually not a factor.

In specific embodiments, the continuous retrograde blood flow rate can be controlled at a base line flow rate in the range from 10 ml/min to 200 ml/min, typically from 20 ml/min to 100 ml/min. These flow rates will be tolerable to the majority of patients. Although flow rate is maintained at the base line flow rate during most of the procedure, at times when the risk of emboli release is increased, the flow rate can be increased above the base line for a short duration in order to improve the ability to capture such emboli. For example, the retrograde blood flow rate can be increased above the base line when the stent catheter is being introduced, when the stent is being deployed, pre- and post-dilatation of the stent, removal of the common carotid artery occlusion, and the like.

The flow rate control system can be cycled between a relatively low flow rate and a relatively high flow rate in order to "flush" the carotid arteries in the region of the carotid bifurcation prior to reestablishing antegrade flow. Such cycling can be established with a high flow rate which can be approximately two to six fold greater than the low flow rate, typically being about three fold greater. The cycles can typically have a length in the range from 0.5 seconds to 10 seconds, usually from 2 seconds to 5 seconds, with the total duration of the cycling being in the range from 5 seconds to 60 seconds, usually from 10 seconds to 30 seconds.

Figure 15:
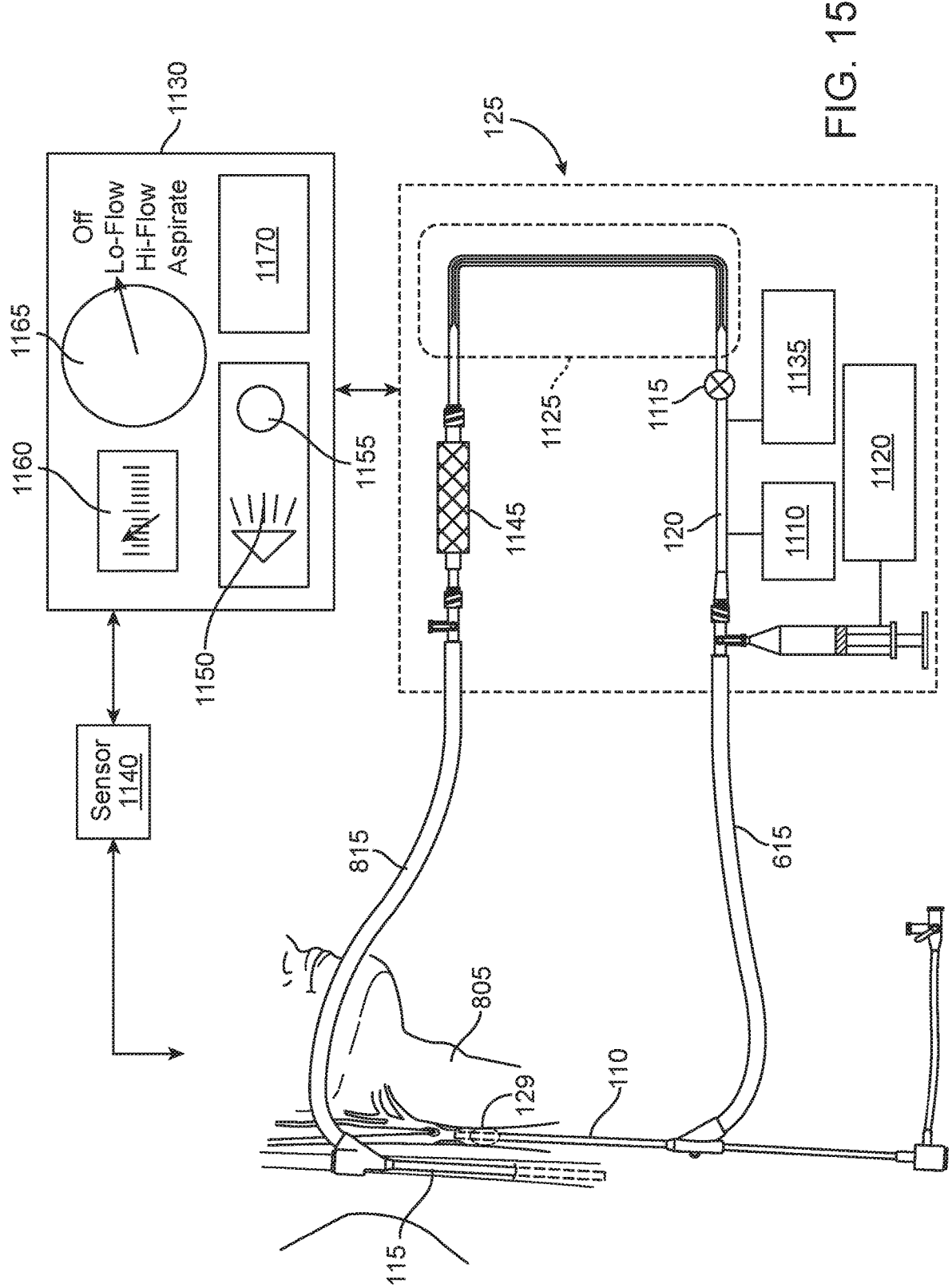
FIG. 15 shows an example of the reverse flow system with a schematic representation of the flow control assembly.

FIG. 15 shows an example of the system 100 with a schematic representation of the flow control assembly 125, which is positioned along the shunt 120 such that retrograde blood flow passes through or otherwise communicates with at least a portion of the flow control assembly 125. The flow control assembly 125 can include various controllable mechanisms for regulating and/or monitoring retrograde flow. The mechanisms can include various means of controlling the retrograde flow, including one or more pumps 1110, valves 1115, syringes 1120 and/or a variable resistance component 1125. The flow control assembly 125 can be manually controlled by a user and/or automatically controlled via a controller 1130 to vary the flow through the shunt 120. For example, varying the flow resistance, the rate of retrograde blood flow through the shunt 120 can be controlled. The controller 1130, which is described in more detail below, can be integrated into the flow control assembly 125 or it can be a separate component that communicates with the components of the flow control assembly 125.

In addition, the flow control assembly 125 can include one or more flow sensors 1135 and/or anatomical data sensors 1140 (described in detail below) for sensing one or more aspects of the retrograde flow. A filter 1145 can be positioned along the shunt 120 for removing emboli before the blood is returned to the venous return site. When the filter 1145 is positioned upstream of the controller 1130, the filter 1145 can prevent emboli from entering the controller 1145 and potentially clogging the variable flow resistance component 1125. It should be appreciated that the various components of the flow control assembly 125 (including the pump 1110, valves 1115, syringes 1120, variable resistance component 1125, sensors 1135/1140, and filter 1145) can be positioned at various locations along the shunt 120 and at various upstream or downstream locations relative to one another. The components of the flow control assembly 125 are not limited to the locations shown in FIG. 15. Moreover, the flow control assembly 125 does not necessarily include all of the components but can rather include various sub-combinations of the components. For example, a syringe could optionally be used within the flow control assembly 125 for purposes of regulating flow or it could be used outside of the assembly for purposes other than flow regulation, such as to introduce fluid such as radiopaque contrast into the artery in an antegrade direction via the shunt 120.

Both the variable resistance component 1125 and the pump 1110 can be coupled to the shunt 120 to control the retrograde flow rate. The variable resistance component 1125 controls the flow resistance, while the pump 1110 provides for positive displacement of the blood through the shunt 120. Thus, the pump can be activated to drive the retrograde flow rather than relying on the perfusion stump pressures of the ECA and ICA and the venous back pressure to drive the retrograde flow. The pump 1110 can be a peristaltic tube pump or any type of pump including a positive displacement pump. The pump 1110 can be activated and deactivated (either manually or automatically via the controller 1130) to selectively achieve blood displacement through the shunt 120 and to control the flow rate through the shunt 120. Displacement of the blood through the shunt 120 can also be achieved in other manners including using the aspiration syringe 1120, or a suction source such as a vacutainer, vaculock syringe, or wall suction may be used. The pump 1110 can communicate with the controller 1130.

One or more flow control valves 1115 can be positioned along the pathway of the shunt. The valve(s) can be manually actuated or automatically actuated (via the controller 1130). The flow control valves 1115 can be, for example one-way valves to prevent flow in the antegrade direction in the shunt 120, check valves, or high pressure valves which would close off the shunt 120, for example during high-pressure contrast injections (which are intended to enter the arterial vasculature in an antegrade direction).

The controller 1130 communicates with components of the system 100 including the flow control assembly 125 to enable manual and/or automatic regulation and/or monitoring of the retrograde flow through the components of the system 100 (including, for example, the shunt 120, the arterial access device 110, the venous return device 115 and the flow control assembly 125). For example, a user can actuate one or more actuators on the controller 1130 to manually control the components of the flow control assembly 125. Manual controls can include switches or dials or similar components located directly on the controller 1130 or components located remote from the controller 1130 such as a foot pedal or similar device. The controller 1130 can also automatically control the components of the system 100 without requiring input from the user. In an embodiment, the user can program software in the controller 1130 to enable such automatic control. The controller 1130 can control actuation of the mechanical portions of the flow control assembly 125. The controller 1130 can include circuitry or programming that interprets signals generated by sensors 1135/1140 such that the controller 1130 can control actuation of the flow control assembly 125 in response to such signals generated by the sensors.

The flow control assembly 125 may also include an active pump actuator which interfaces with an element in the shunt to enable active retrograde pumping of blood, such as a pump head for a roller pump, a rotary motor for an impeller-style pump, or the like. The controller 1130 would provide controls for the pump rate.

The representation of the controller 1130 in FIG. 15 is merely exemplary. It should be appreciated that the controller 1130 can vary in appearance and structure. The controller 1130 is shown in FIG. 15 as being integrated in a single housing. This permits the user to control the flow control assembly 125 from a single location. It should be appreciated that any of the components of the controller 1130 can be separated into separate housings. Further, FIG. 15 shows the controller 1130 and flow control assembly 125 as separate housings. It should be appreciated that the controller 1130 and flow control regulator 125 can be integrated into a single housing or can be divided into multiple housings or components.

Flow State Indicator(s)

The controller 1130 can include one or more indicators that provides a visual and/or audio signal to the user regarding the state of the retrograde flow. An audio indication advantageously reminds the user of a flow state without requiring the user to visually check the flow controller 1130. The indicator(s) can include a speaker 1150 and/or a light 1155 or any other means for communicating the state of retrograde flow to the user. The controller 1130 can communicate with one or more sensors of the system to control activation of the indicator. Or, activation of the indicator can be tied directly to the user actuating one of the flow control actuators 1165. The indicator need not be a speaker or a light. The indicator could simply be a button or switch that visually indicates the state of the retrograde flow. For example, the button being in a certain state (such as a pressed or down state) may be a visual indication that the retrograde flow is in a high state. Or, a switch or dial pointing toward a particular labeled flow state may be a visual indication that the retrograde flow is in the labeled state.

The indicator can provide a signal indicative of one or more states of the retrograde flow. In an embodiment, the indicator identifies only two discrete states: a state of "high" flow rate and a state of "low" flow rate. In another embodiment, the indicator identifies more than two flow rates, including a "high" flow rate, a "medium" flow rate, and a "low" rate. The indicator can be configured to identify any quantity of discrete states of the retrograde flow or it can identify a graduated signal that corresponds to the state of the retrograde flow. In this regard, the indicator can be a digital or analog meter 1160 that indicates a value of the retrograde flow rate, such as in ml/min or any other units.

In an embodiment, the indicator is configured to indicate to the user whether the retrograde flow rate is in a state of "high" flow rate or a "low" flow rate. For example, the indicator may illuminate in a first manner (e.g., level of brightness) and/or emit a first audio signal when the flow rate is high and then change to a second manner of illumination and/or emit a second audio signal when the flow rate is low. Or, the indicator may illuminate and/or emit an audio signal only when the flow rate is high, or only when the flow rate is low. Given that some patients may be intolerant of a high flow rate or intolerant of a high flow rate beyond an extended period of time, it can be desirable that the indicator provide notification to the user when the flow rate is in the high state. This would serve as a fail safe feature.

In another embodiment, the indicator provides a signal (audio and/or visual) when the flow rate changes state, such as when the flow rate changes from high to low and/or vice-versa. In another embodiment, the indicator provides a signal when no retrograde flow is present, such as when the shunt 120 is blocked or one of the stopcocks in the shunt 120 is closed.

Flow Rate Actuators

The controller 1130 can include one or more actuators that the user can press, switch, manipulate, or otherwise actuate to regulate the retrograde flow rate and/or to monitor the flow rate. For example, the controller 1130 can include a flow control actuator 1165 (such as one or more buttons, knobs, dials, switches, etc.) that the user can actuate to cause the controller to selectively vary an aspect of the reverse flow. For example, in the illustrated embodiment, the flow control actuator 1165 is a knob that can be turned to various discrete positions each of which corresponds to the controller 1130 causing the system 100 to achieve a particular retrograde flow state. The states include, for example, (a) OFF; (b) LO-FLOW; (c) HI-FLOW; and (d) ASPIRATE. It should be appreciated that the foregoing states are merely exemplary and that different states or combinations of states can be used. The controller 1130 achieves the various retrograde flow states by interacting with one or more components of the system, including the sensor(s), valve(s), variable resistance component, and/or pump(s). It should be appreciated that the controller 1130 can also include circuitry and software that regulates the retrograde flow rate and/or monitors the flow rate such that the user wouldn't need to actively actuate the controller 1130.

The OFF state corresponds to a state where there is no retrograde blood flow through the shunt 120. When the user sets the flow control actuator 1165 to OFF, the controller 1130 causes the retrograde flow to cease, such as by shutting off valves or closing a stop cock in the shunt 120. The LO-FLOW and HI-FLOW states correspond to a low retrograde flow rate and a high retrograde flow rate, respectively. When the user sets the flow control actuator 1165 to LO-FLOW or HI-FLOW, the controller 1130 interacts with components of the flow control regulator 125 including pump(s) 1110, valve(s) 1115 and/or variable resistance component 1125 to increase or decrease the flow rate accordingly. Finally, the ASPIRATE state corresponds to opening the circuit to a suction source, for example a vacutainer or suction unit, if active retrograde flow is desired. The suction source can be coupled to any portion of the circuit, including the shunt 120 or the arterial access device 110.

The system can be used to vary the blood flow between various states including an active state, a passive state, an aspiration state, and an off state. The active state corresponds to the system using a means that actively drives retrograde blood flow. Such active means can include, for example, a pump, syringe, vacuum source, etc. The passive state corresponds to when retrograde blood flow is driven by the perfusion stump pressures of the ECA and ICA and possibly the venous pressure. The aspiration state corresponds to the system using a suction source, for example a vacutainer or suction unit, to drive retrograde blood flow. The off state corresponds to the system having zero retrograde blood flow such as the result of closing a stopcock or valve. The low and high flow rates can be either passive or active flow states. In an embodiment, the particular value (such as in ml/min) of either the low flow rate and/or the high flow rate can be predetermined and/or pre-programmed into the controller such that the user does not actually set or input the value. Rather, the user simply selects "high flow" and/or "low flow" (such as by pressing an actuator such as a button on the controller 1130) and the controller 1130 interacts with one or more of the components of the flow control assembly 125 to cause the flow rate to achieve the predetermined high or low flow rate value. In another embodiment, the user sets or inputs a value for low flow rate and/or high flow rate such as into the controller. In another embodiment, the low flow rate and/or high flow rate is not actually set. Rather, external data (such as data from the anatomical data sensor 1140) is used as the basis for affects the flow rate.

The flow control actuator 1165 can be multiple actuators, for example one actuator, such as a button or switch, to switch state from LO-FLOW to HI-FLOW and another to close the flow loop to OFF, for example during a contrast injection where the contrast is directed antegrade into the carotid artery. In an embodiment, the flow control actuator 1165 can include multiple actuators. For example, one actuator can be operated to switch flow rate from low to high, another actuator can be operated to temporarily stop flow, and a third actuator (such as a stopcock) can be operated for aspiration using a syringe. In another example, one actuator is operated to switch to LO-FLOW and another actuator is operated to switch to HI-FLOW. Or, the flow control actuator 1165 can include multiple actuators to switch states from LO-FLOW to HI-FLOW and additional actuators for fine-tuning flow rate within the high flow state and low flow state. Upon switching between LO-FLOW and HI-FLOW, these additional actuators can be used to fine-tune the flow rates within those states. Thus, it should be appreciated that within each state (i.e. high flow state and low flow states) a variety of flow rates can be dialed in and fine-tuned. A wide variety of actuators can be used to achieve control over the state of flow.

The controller 1130 or individual components of the controller 1130 can be located at various positions relative to the patient and/or relative to the other components of the system 100. For example, the flow control actuator 1165 can be located near the hemostasis valve where any interventional tools are introduced into the patient in order to facilitate access to the flow control actuator 1165 during introduction of the tools. The location may vary, for example, based on whether a transfemoral or a transcervical approach is used. The controller 1130 can have a wireless connection to the remainder of the system 100 and/or a wired connection of adjustable length to permit remote control of the system 100. The controller 1130 can have a wireless connection with the flow control regulator 125 and/or a wired connection of adjustable length to permit remote control of the flow control regulator 125. The controller 1130 can also be integrated in the flow control regulator 125. Where the controller 1130 is mechanically connected to the components of the flow control assembly 125, a tether with mechanical actuation capabilities can connect the controller 1130 to one or more of the components. In an embodiment, the controller 1130 can be positioned a sufficient distance from the system 100 to permit positioning the controller 1130 outside of a radiation field when fluoroscopy is in use.

The controller 1130 and any of its components can interact with other components of the system (such as the pump(s), sensor(s), shunt, etc) in various manners. For example, any of a variety of mechanical connections can be used to enable communication between the controller 1130 and the system components. Alternately, the controller 1130 can communicate electronically or magnetically with the system components. Electro-mechanical connections can also be used. The controller 1130 can be equipped with control software that enables the controller to implement control functions with the system components. The controller itself can be a mechanical, electrical or electro-mechanical device. The controller can be mechanically, pneumatically, or hydraulically actuated or electromechanically actuated (for example in the case of solenoid actuation of flow control state). The controller 1130 can include a computer, computer processor, and memory, as well as data storage capabilities.

Sensor(s)

As mentioned, the flow control assembly 125 can include or interact with one or more sensors, which communicate with the system 100 and/or communicate with the patient's anatomy. Each of the sensors can be adapted to respond to a physical stimulus (including, for example, heat, light, sound, pressure, magnetism, motion, etc.) and to transmit a resulting signal for measurement or display or for operating the controller 1130. In an embodiment, the flow sensor 1135 interacts with the shunt 120 to sense an aspect of the flow through the shunt 120, such as flow velocity or volumetric rate of blood flow. The flow sensor 1135 could be directly coupled to a display that directly displays the value of the volumetric flow rate or the flow velocity. Or the flow sensor 1135 could feed data to the controller 1130 for display of the volumetric flow rate or the flow velocity.

The type of flow sensor 1135 can vary. The flow sensor 1135 can be a mechanical device, such as a paddle wheel, flapper valve, rolling ball, or any mechanical component that responds to the flow through the shunt 120. Movement of the mechanical device in response to flow through the shunt 120 can serve as a visual indication of fluid flow and can also be calibrated to a scale as a visual indication of fluid flow rate. The mechanical device can be coupled to an electrical component. For example, a paddle wheel can be positioned in the shunt 120 such that fluid flow causes the paddle wheel to rotate, with greater rate of fluid flow causing a greater speed of rotation of the paddle wheel. The paddle wheel can be coupled magnetically to a Hall-effect sensor to detect the speed of rotation, which is indicative of the fluid flow rate through the shunt 120.

In an embodiment, the flow sensor 1135 is an ultrasonic or electromagnetic flow meter, which allows for blood flow measurement without contacting the blood through the wall of the shunt 120. An ultrasonic or electromagnetic flow meter can be configured such that it does not have to contact the internal lumen of the shunt 120. In an embodiment, the flow sensor 1135 at least partially includes a Doppler flow meter, such as a Transonic flow meter, that measures fluid flow through the shunt 120. It should be appreciated that any of a wide variety of sensor types can be used including an ultrasound flow meter and transducer. Moreover, the system can include multiple sensors.

The system 100 is not limited to using a flow sensor 1135 that is positioned in the shunt 120 or a sensor that interacts with the venous return device 115 or the arterial access device 110. For example, an anatomical data sensor 1140 can communicate with or otherwise interact with the patient's anatomy such as the patient's neurological anatomy. In this manner, the anatomical data sensor 1140 can sense a measurable anatomical aspect that is directly or indirectly related to the rate of retrograde flow from the carotid artery. For example, the anatomical data sensor 1140 can measure blood flow conditions in the brain, for example the flow velocity in the middle cerebral artery, and communicate such conditions to a display and/or to the controller 1130 for adjustment of the retrograde flow rate based on predetermined criteria. In an embodiment, the anatomical data sensor 1140 comprises a transcranial Doppler ultrasonography (TCD), which is an ultrasound test that uses reflected sound waves to evaluate blood as it flows through the brain. Use of TCD results in a TCD signal that can be communicated to the controller 1130 for controlling the retrograde flow rate to achieve or maintain a desired TCD profile. The anatomical data sensor 1140 can be based on any physiological measurement, including reverse flow rate, blood flow through the middle cerebral artery, TCD signals of embolic particles, or other neuromonitoring signals.

In an embodiment, the system 100 comprises a closed-loop control system. In the closed-loop control system, one or more of the sensors (such as the flow sensor 1135 or the anatomical data sensor 1140) senses or monitors a predetermined aspect of the system 100 or the anatomy (such as, for example, reverse flow rate and/or neuromonitoring signal). The sensor(s) feed relevant data to the controller 1130, which continuously adjusts an aspect of the system as necessary to maintain a desired retrograde flow rate. The sensors communicate feedback on how the system 100 is operating to the controller 1130 so that the controller 1130 can translate that data and actuate the components of the flow control regulator 125 to dynamically compensate for disturbances to the retrograde flow rate. For example, the controller 1130 may include software that causes the controller 1130 to signal the components of the flow control assembly 125 to adjust the flow rate such that the flow rate is maintained at a constant state despite differing blood pressures from the patient. In this embodiment, the system 100 need not rely on the user to determine when, how long, and/or what value to set the reverse flow rate in either a high or low state. Rather, software in the controller 1130 can govern such factors. In the closed loop system, the controller 1130 can control the components of the flow control assembly 125 to establish the level or state of retrograde flow (either analog level or discreet state such as high, low, baseline, medium, etc.) based on the retrograde flow rate sensed by the sensor 1135.

In an embodiment, the anatomical data sensor 1140 (which measures a physiologic measurement in the patient) communicates a signal to the controller 1130, which adjusts the flow rate based on the signal. For example the physiological measurement may be based on flow velocity through the MCA, TCD signal, or some other cerebral vascular signal. In the case of the TCD signal, TCD may be used to monitor cerebral flow changes and to detect microemboli. The controller 1130 may adjust the flow rate to maintain the TCD signal within a desired profile. For example, the TCD signal may indicate the presence of microemboli ("TCD hits") and the controller 1130 can adjust the retrograde flow rate to maintain the TCD hits below a threshold value of hits.

In the case of the MCA flow, the controller 1130 can set the retrograde flow rate at the "maximum" flow rate that is tolerated by the patient, as assessed by perfusion to the brain. The controller 1130 can thus control the reverse flow rate to optimize the level of protection for the patient without relying on the user to intercede. In another embodiment, the feedback is based on a state of the devices in the system 100 or the interventional tools being used. For example, a sensor may notify the controller 1130 when the system 100 is in a high risk state, such as when an interventional catheter is positioned in the sheath 605. The controller 1130 then adjusts the flow rate to compensate for such a state.

The controller 1130 can be used to selectively augment the retrograde flow in a variety of manners. For example, it has been observed that greater reverse flow rates may cause a resultant greater drop in blood flow to the brain, most importantly the ipsilateral MCA, which may not be compensated enough with collateral flow from the Circle of Willis. Thus a higher reverse flow rate for an extended period of time may lead to conditions where the patient's brain is not getting enough blood flow, leading to patient intolerance as exhibited by neurologic symptoms. Studies show that MCA blood velocity less than 10 cm/sec is a threshold value below which patient is at risk for neurological blood deficit. There are other markers for monitoring adequate perfusion to the brains, such as EEG signals. However, a high flow rate may be tolerated even up to a complete stoppage of MCA flow for a short period, up to about 15 seconds to 1 minute.

Thus, the controller 1130 can optimize embolic debris capture by automatically increasing the reverse flow only during limited time periods which correspond to periods of heightened risk of emboli generation during a procedure. These periods of heightened risk include the period of time while an interventional device (such as the thrombectomy device 15) crosses the thrombotic occlusion 10. During lower risk periods, the controller can cause the reverse flow rate to revert to a lower, baseline level. This lower level may correspond to a low reverse flow rate in the ICA, or even slight antegrade flow in those patients with a high ECA to ICA perfusion pressure ratio.

In a flow regulation system where the user manually sets the state of flow, there is risk that the user may not pay attention to the state of retrograde flow (high or low) and accidentally keep the circuit on high flow. This may then lead to adverse patient reactions. In an embodiment, as a safety mechanism, the default flow rate is the low flow rate. This serves as a fail safe measure for patient's that are intolerant of a high flow rate. In this regard, the controller 1130 can be biased toward the default rate such that the controller causes the system to revert to the low flow rate after passage of a predetermined period of time of high flow rate. The bias toward low flow rate can be achieved via electronics or software, or it can be achieved using mechanical components, or a combination thereof. In an embodiment, the flow control actuator 1165 of the controller 1130 and/or valve(s) 1115 and/or pump(s) 1110 of the flow control regulator 125 are spring loaded toward a state that achieves a low flow rate. The controller 1130 is configured such that the user may over-ride the controller 1130 such as to manually cause the system to revert to a state of low flow rate if desired.

In another safety mechanism, the controller 1130 includes a timer 1170 (FIG. 15) that keeps time with respect to how long the flow rate has been at a high flow rate. The controller 1130 can be programmed to automatically cause the system 100 to revert to a low flow rate after a predetermined time period of high flow rate, for example after 15, 30, or 60 seconds or more of high flow rate. After the controller reverts to the low flow rate, the user can initiate another predetermined period of high flow rate as desired. Moreover, the user can override the controller 1130 to cause the system 100 to move to the low flow rate (or high flow rate) as desired.

In an exemplary procedure, embolic debris capture is optimized while not causing patient tolerance issues by initially setting the level of retrograde flow at a low rate, and then switching to a high rate for discreet periods of time during critical stages in the procedure. Alternately, the flow rate is initially set at a high rate, and then verifying patient tolerance to that level before proceeding with the rest of the procedure. If the patient shows signs of intolerance, the retrograde flow rate is lowered. Patient tolerance may be determined automatically by the controller based on feedback from the anatomical data sensor 1140 or it may be determined by a user based on patient observation. The adjustments to the retrograde flow rate may be performed automatically by the controller or manually by the user.

Alternately, the user may monitor the flow velocity through the middle cerebral artery (MCA), for example using TCD, and then to set the maximum level of reverse flow which keeps the MCA flow velocity above the threshold level. In this situation, the entire procedure may be done without modifying the state of flow. Adjustments may be made as needed if the MCA flow velocity changes during the course of the procedure, or the patient exhibits neurologic symptoms.

Exemplary Mechanism to Regulate Reverse Flow

The system 100 is adapted to regulate retrograde flow in a variety of manners. Any combination of the pump 1110, valve 1115, syringe 1120, and/or variable resistance component 1125 can be manually controlled by the user or automatically controlled via the controller 1130 to adjust the retrograde flow rate. Thus, the system 100 can regulate retrograde flow in various manners, including controlling an active flow component (e.g., pump, syringe, etc.), reducing the flow restriction, switching to an aspiration source (such as a pre-set VacLock syringe, Vacutainer, suction system, or the like), or any combination thereof.

In the situation where an external receptacle or reservoir is used, the retrograde flow may be augmented in various manners. The reservoir has a head height comprised of the height of the blood inside the reservoir and the height of the reservoir with respect to the patient. Reverse flow into the reservoir may be modulated by setting the reservoir height to increase or decrease the amount of pressure gradient from the CCA to the reservoir. In an embodiment, the reservoir is raised to increase the reservoir pressure to a pressure that is greater than venous pressure. Or, the reservoir can be positioned below the patient, such as down to a level of the floor, to lower the reservoir pressure to a pressure below venous or atmospheric pressure.

The variable flow resistance in shunt 120 may be provided in a wide variety of ways. In this regard, flow resistance component 1125 can cause a change in the size or shape of the shunt to vary flow conditions and thereby vary the flow rate. Or, the flow resistance component 1125 can re-route the blood flow through one or more alternate flow pathways in the shunt to vary the flow conditions. Some exemplary embodiments of the flow resistance component 1125 are now described.

Figure 16A:
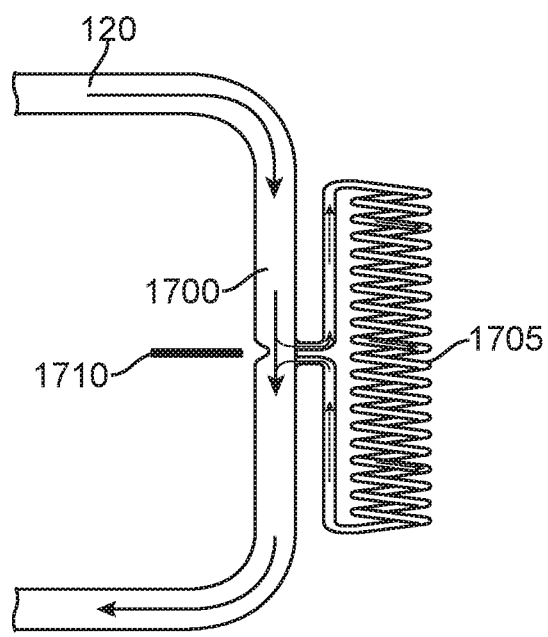
FIG. 16A-16B an embodiment of a variable flow resistance component useful in the methods and systems of the present disclosure.
Figure 16B:
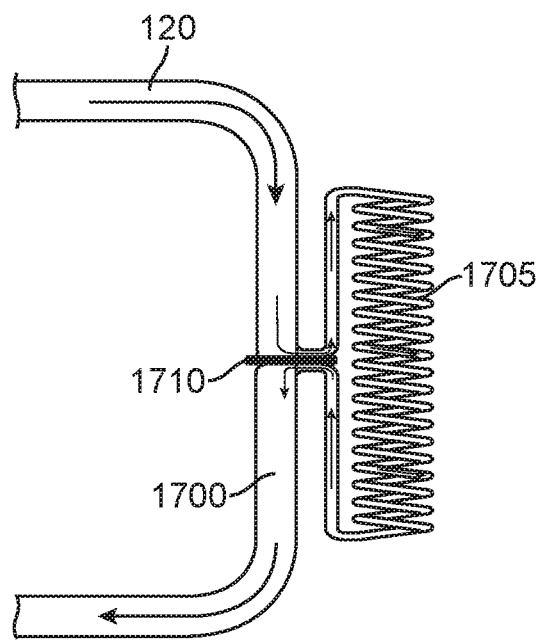
Figure 17:
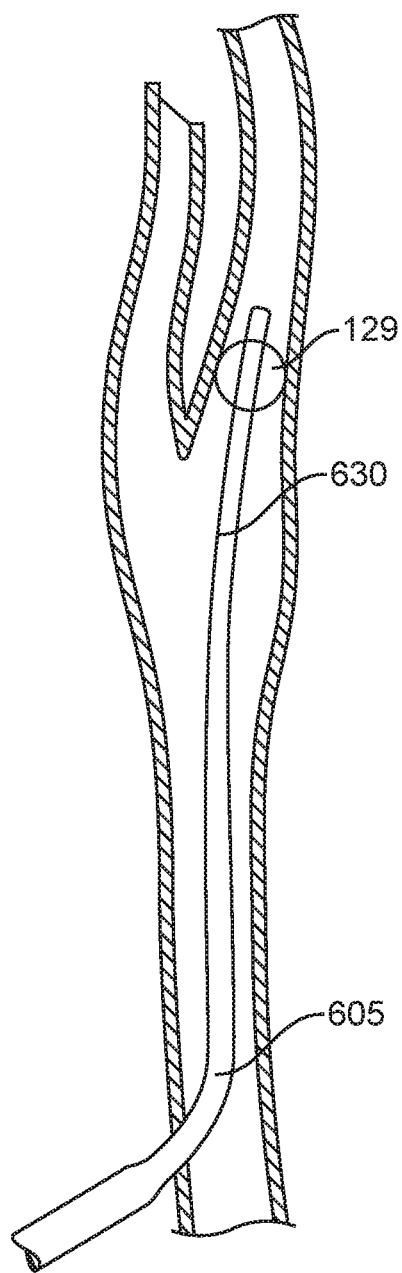
FIG. 17 shows an arterial access device having a stepped configuration.

In a non-limiting embodiment, the flow resistance through shunt 120 may be changed by providing two or more alternative flow paths. As shown in FIGS. 16A and 16B, the flow through shunt 120 passes through a main lumen 1700 as well as secondary lumen 1705. The secondary lumen 1705 is longer and/or has a smaller diameter than the main lumen 1700. Thus, the secondary lumen 1705 has higher flow resistance than the main lumen 1700. By passing the blood through both these lumens, the flow resistance will be at a minimum. Blood is able to flow through both lumens 1700 and 1705 due to the pressure drop created in the main lumen 1700 across the inlet and outlet of the secondary lumen 1705. This has the benefit of preventing stagnant blood. As shown in FIG. 20B, by blocking flow through the main lumen 1700 of shunt 120, the flow can be diverted entirely to the secondary lumen 1705, thus increasing the flow resistance and reducing the blood flow rate. It will be appreciated that additional flow lumens could also be provided in parallel to allow for a three, four, or more discrete flow resistances. The shunt 120 may be equipped with a valve 1710 that controls flow to the main lumen 1700 and the secondary lumen 1705 with the valve 1710 being controlled by the controller 1130 or being controlled manually by the user. The embodiment of FIGS. 16A and 16B has an advantage in that this embodiment in that it does not require as small of lumen sizes to achieve desired retrograde flow rates as some of the other embodiments of variable flow resistance mechanisms. This is a benefit in blood flow lines in that there is less chance of clogging and causing clots in larger lumen sizes than smaller lumen sizes.

Closure

Any type of closing element, including a self-closing element, may be deployed about the penetration in the wall of the common carotid artery prior to withdrawing the sheath 605 at the end of the procedure. The closing element can be deployed at or near the beginning of the procedure, but optionally, the closing element could be deployed as the sheath is being withdrawn, often being released from a distal end of the sheath onto the wall of the artery where the penetration occurs, such as the common carotid artery. Use of a self-closing element is advantageous since it affects substantially the rapid closure of the penetration in the common carotid artery as the sheath is being withdrawn. Such rapid closure can reduce or eliminate unintended blood loss either at the end of the procedure or during accidental dislodgement of the sheath. In addition, such a self-closing element may reduce the risk of arterial wall dissection during access. Further, the self-closing element may be configured to exert a frictional or other retention force on the sheath during the procedure. Such a retention force is advantageous and can reduce the chance of accidentally dislodging the sheath during the procedure. A self-closing element eliminates the need for vascular surgical closure of the artery with suture after sheath removal, reducing the need for a large surgical field and greatly reducing the surgical skill required for the procedure.

The disclosed systems and methods may employ a wide variety of closing elements, such as mechanical elements which include an anchor portion and a closing portion such as a self-closing portion. The anchor portion may comprise hooks, pins, staples, clips, tine, suture, or the like, which are engaged in the exterior surface of the common carotid artery about the penetration to immobilize the self-closing element when the penetration is fully open. The self-closing element may also include a spring-like or other self-closing portion which, upon removal of the sheath, will close the anchor portion in order to draw the tissue in the arterial wall together to provide closure. Usually, the closure will be sufficient so that no further measures need be taken to close or seal the penetration. Optionally, however, it may be desirable to provide for supplemental sealing of the self-closing element after the sheath is withdrawn. For example, the self-closing element and/or the tissue tract in the region of the element can be treated with hemostatic materials, such as bioabsorbable polymers, collagen plugs, glues, sealants, clotting factors, or other clot-promoting agents. Alternatively, the tissue or self-closing element could be sealed using other sealing protocols, such as electrocautery, suturing, clipping, stapling, or the like. In another method, the self-closing element will be a self-sealing membrane or gasket material which is attached to the outer wall of the vessel with clips, glue, bands, or other means. The self-sealing membrane may have an inner opening such as a slit or cross cut, which would be normally closed against blood pressure. Any of these self-closing elements could be designed to be placed in an open surgical procedure, or deployed percutaneously. The closure example described below can be modified for delivery of an expandable collagen plug that unfurls or expands once deployed at the artery so as to fill an arterial opening and achieve hemostasis.

In an embodiment, the closing element is a is a suture-based blood vessel closure device that can perform the dilation of an arteriotomy puncture, and therefore does not require previous dilation of the arteriotomy puncture by a separate device or by a procedural sheath dilator. The suture-based vessel closure device can place one or more sutures across a vessel access site such that, when the suture ends are tied off after sheath removal, the stitch or stitches provide hemostasis to the access site. The sutures can be applied either prior to insertion of a procedural sheath through the arteriotomy or after removal of the sheath from the arteriotomy. The device can maintain temporary hemostasis of the arteriotomy after placement of sutures but before and during placement of a procedural sheath and can also maintain temporary hemostasis after withdrawal of the procedural sheath but before tying off the suture. Some exemplary suture-based blood vessel disclosure devices are described in the following U.S. Patents, which are incorporated herein by reference in their entirety: U.S. Pat. Nos. 7,001,400, and 7,004,952.

Figure 19B:
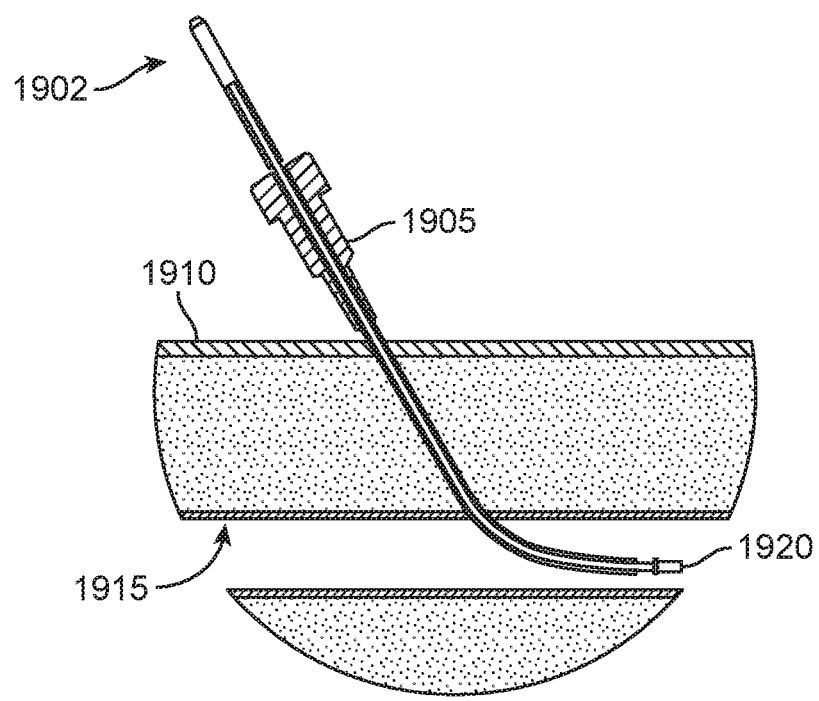

In an embodiment described with reference to FIGS. 19A through 19D, there is shown a system and method for hemostasis of a puncture site in an artery such as the carotid artery using a hemostasis delivery device 1902, which can be an elongated body configured to deploy a device configured to achieve hemostasis. A user deploys an introducer sheath 1905 (which can be a separate sheath or can be the arterial access device 110) into the access location of the artery such as in the neck. The introducer sheath can be percutaneously deployed to the artery. The access location can extend through skin 1910 and an outer wall of the carotid artery CA. A distal end of the sheath 1905 is positioned in a lumen 1915 of the carotid artery CA. As shown in FIG. 19B, the user then inserts the hemostasis delivery device 1902 through the introducer sheath 1905 with a hemostasis member coupled to the hemostasis delivery device such as at a distal end or region of the hemostasis delivery device. The hemostasis member can be, for example, an expansible hemostasis member 1920. The hemostasis delivery device 1902 is deployed through the sheath 1905 such that the hemostasis member 1920 is positioned outside a distal tip of the sheath 1905 and in the lumen 1915.

Figure 19C:
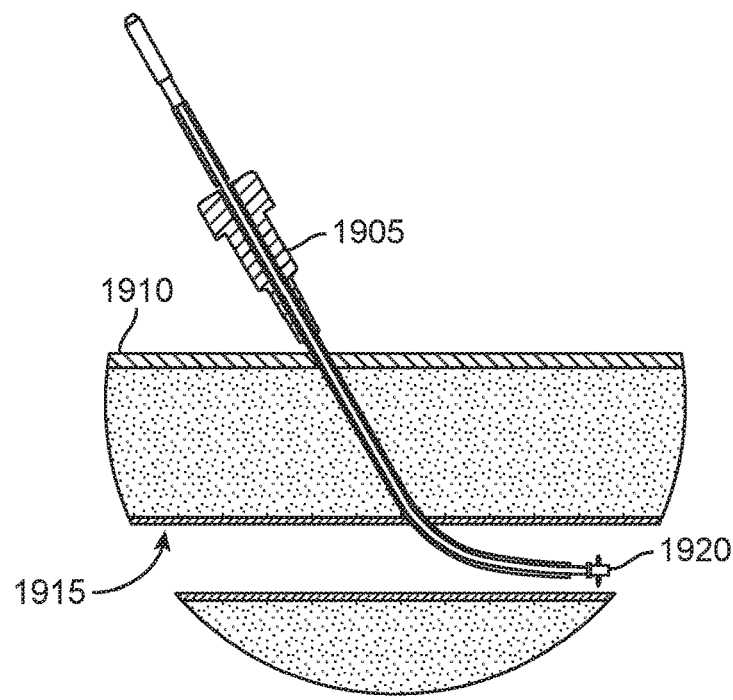
Figure 19D:
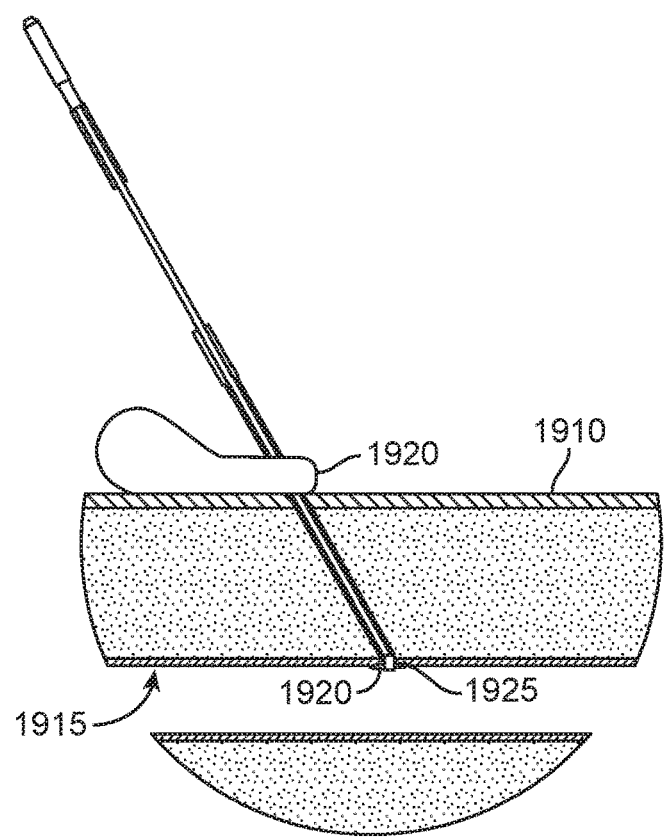

With reference now to FIGS. 19C and 19D, the hemostasis member 1720 is then caused to be deployed. The hemostasis member 1920 can be caused to expand outward and then the hemostasis device 1902 is pulled proximally to engage the hemostasis member 1920 with the wall of the artery. The introducer sheath 1905 is then removed leaving the expansible hemostasis member 1920 seated at a location 1925 that forms the entry into the carotid artery CA to achieve hemostasis. An external tension element, such as a clip 1920, can be positioned at the skin surface to maintain tension to hold the expansible hemostasis member 1720 in position. U.S. Pat. No. 7,993,366, which is incorporated by reference, describes an example closure system.

Interventional Devices

Any of a wide variety of interventional devices can be used in conjunction with the disclosed system such as the insertion through the arterial access device 110. For example, the interventional device can comprise a catheter such as, for example, an aspiration catheter formed of an elongated body have any proximal end and a distal end with a lumen there through the forms at least one opening at or near the proximal end and at least one opening at or near the distal end. In a nonlimiting example, an aspiration catheter has an inner diameter in the range of 0.071 inch, 0.058 inch, or 0.045 inch or thereabout. In another nonlimiting example, an aspiration catheter has a length of 58 cm or about 58 cm. The aspiration catheter can have an overall length of about 67 cm or about 63 cm and/or a working length of about 62 cm or 58 cm. An aspiration catheter can have an outer diameter of about 0.069 inch or 0.082 inch. In an embodiment, the interventional device is a 0.088 inch catheter with respect to an internal lumen of the catheter. The distal sheath 605 of the arterial access device 110 can have a 0.088 inch inner diameter or a 0.058 inch inner diameter. Or the inner diameter can be in the range of 0.07x inch in non-limiting examples.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

The invention claimed is:

1. A transcarotid access system configured for treatment of a neurovascular condition, comprising: an arterial access sheath having a sheath body defining an internal lumen, the sheath body sized and shaped to be introduced into an opening in a common carotid artery and receive blood flow from the carotid artery; an adapter positioned at a proximal end of the sheath body, the adapter having a hub adapted to be removably connected to a flow shunt line, the adapter further having a valve positioned adjacent to an internal lumen of the transcarotid access system, wherein the valve regulates fluid flow out of the internal lumen of the arterial access sheath toward the hub; and a proximal extension connected to a proximal end of the adapter, the proximal extension having an internal lumen in fluid communication with the internal lumen of the arterial access sheath via the adapter, the proximal extension formed of an elongated body that defines a proximal opening that communicates with the internal lumen of the proximal extension, wherein the proximal opening is completely unimpeded.

2. A transcarotid access system as in claim 1, wherein the adapter and the proximal extension are removably connected to the arterial access sheath at a connection site.

3. A transcarotid access system as in claim 2, further comprising a first connector component positioned at the proximal end of the sheath body and a second connector component positioned at a distal end of the adaptor.

4. A transcarotid access system as in claim 2, wherein the connection site is positioned between the adapter and the arterial access sheath.

5. A transcarotid access system as in claim 2, wherein the at least one of the first connector component and the second connector component is a hemostasis valve adapter.

6. A transcarotid access system as in claim 1, wherein the arterial access sheath has a total length less than 20 cm.

7. A transcarotid access system as in claim 1, further comprising an eyelet located on a connector that connects the proximal extension to the adapter.

8. A transcarotid access system as in claim 1, wherein the valve transitions between an open state that permits flow out of the internal lumen of the arterial access sheath and a closed state that blocks flow out of the internal lumen of the transcarotid access system.

9. A transcarotid access system as in claim 1, further comprising an interventional catheter configured to be inserted into a neurovasculature via the arterial access sheath.

10. A transcarotid access system as in claim 1, further comprising a reverse flow shunt removably connected to the adapter via the hub.

11. A transcarotid access system as in claim 10, further comprising a flow control assembly coupled to the reverse flow shunt, the flow control assembly configured to regulate blood flow through the reverse flow shunt.

12. A transcarotid access system as in claim 11, further comprising a venous return device fluidly coupled to the reverse flow shunt, the venous return device being insertable into a vein.

13. A transcarotid access system as in claim 12, wherein the venous return device is insertable into a femoral vein.

14. A method of treating an intracranial artery comprising: inserting an arterial access device into a carotid artery via an opening in the carotid artery and access location in a neck of a patient, the arterial access device including: an arterial access sheath having a sheath body defining an internal lumen, the sheath body sized and shaped to be introduced into an opening in a common carotid artery and receive blood flow from the carotid artery; an adapter positioned at a proximal end of the sheath body, the adapter having a hub adapted to be removably connected to a flow shunt line, the adapter further having a valve positioned adjacent to an internal lumen of the transcarotid access system, wherein the valve regulates fluid flow out of the internal lumen of the arterial access sheath toward the hub; and a proximal extension connected to a proximal end of the adapter, the proximal extension having an internal lumen in fluid communication with the internal lumen of the arterial access sheath via the adapter, the proximal extension formed of an elongated body that defines a proximal opening that communicates with the internal lumen of the proximal extension, wherein the proximal opening is completely unimpeded; deploying an interventional device into the carotid artery via the arterial access device and treating an intracranial artery using the interventional device; detaching the adapter and proximal extension from the arterial access sheath such that the arterial access sheath remains inserted in the carotid artery without the adapter and proximal extension; inserting a closure element into the arterial access sheath; and deploying the closure element to achieve hemostasis in the opening of the carotid artery.

15. A method as in claim 14, wherein the opening in the carotid artery is in the common carotid artery.

16. A method as in claim 14, wherein the opening in the carotid artery is percutaneously formed.

17. A method as in claim 14, wherein the arterial access sheath has a length of 20 cm.

18. A method as in claim 14, wherein the arterial access sheath has a length of 16 cm.

19. A method as in claim 14, further comprising a first connector component positioned at the proximal end of the sheath body and a second connector component positioned at a distal end of the adaptor, wherein the first connector component and the second connector component removably attach to one another.

20. A method as in claim 19, wherein at least one of the first connector component and the second connector component is a hemostasis valve adapter.

* * * * *